(12) United States Patent
Makino et al.

(10) Patent No.: US 11,908,214 B2
(45) Date of Patent: Feb. 20, 2024

(54) OBJECT MANAGEMENT SYSTEM

(71) Applicant: NEC Corporation, Tokyo (JP)

(72) Inventors: Kengo Makino, Tokyo (JP); Toru Takahashi, Tokyo (JP); Rui Ishiyama, Tokyo (JP); Yuta Kudo, Tokyo (JP)

(73) Assignee: NEC CORPORATION, Tokyo (JP)

(*) Notice: Subject to any disclaimer, the term of this patent is extended or adjusted under 35 U.S.C. 154(b) by 257 days.

(21) Appl. No.: 17/618,132

(22) PCT Filed: Jun. 21, 2019

(86) PCT No.: PCT/JP2019/024786
§ 371 (c)(1),
(2) Date: Dec. 10, 2021

(87) PCT Pub. No.: WO2020/255394
PCT Pub. Date: Dec. 24, 2020

(65) Prior Publication Data
US 2022/0277573 A1    Sep. 1, 2022

(51) Int. Cl.
*G06V 30/146* (2022.01)
*G06V 30/14* (2022.01)
*G06V 30/19* (2022.01)

(52) U.S. Cl.
CPC ...... *G06V 30/1473* (2022.01); *G06V 30/1456* (2022.01); *G06V 30/19093* (2022.01)

(58) Field of Classification Search
CPC ........... G06V 30/1473; G06V 30/1456; G06V 30/19093
See application file for complete search history.

(56) References Cited

FOREIGN PATENT DOCUMENTS

| JP | H04-367983 A |   | 12/1992 |
|----|--------------|---|---------|
| JP | 2007-079967 A |   | 3/2007 |
| JP | 2007079967 A | * | 3/2007 |
| JP | 2010-079643 A |   | 4/2010 |
| JP | 2010079643 A | * | 4/2010 |
| JP | 2013-196630 A |   | 9/2013 |

OTHER PUBLICATIONS

Japanese Office Action for JP Application No. 2021-528612 dated Sep. 20, 2022 with English Translation.
International Search Report for PCT Application No. PCT/JP2019/024786, dated Sep. 10, 2019.
Akiba Norimitsu et al, "Development of semiautomated geometric image transformation programs for forensic engineering examination", Forensic Science and Technology, 20(2), pp. 157-164 (2015).

* cited by examiner

*Primary Examiner* — Wednel Cadeau
(74) *Attorney, Agent, or Firm* — Sughrue Mion, PLLC

(57) ABSTRACT

An object management system includes an acquisition means for acquiring an image in which a surface of a registration target object, having a circle and a handwritten character drawn thereon, is captured, a generation means for detecting an ellipse corresponding to the circle from the image and generating a registration image in which the image is applied with projective transformation such that the ellipse becomes a circle, and a registration means for writing the registration image into a storage means as data for determining the sameness of the registration target object.

11 Claims, 29 Drawing Sheets

100 OBJECT MANAGEMENT SYSTEM

$$\cdots (1)$$

FIG. 7

| ECCENTRICITY RANGE | DISTANCE $\delta$ |
|---|---|
| 0 OR LARGER, LESS THAN 0.1 | $\delta 1$ |
| 0.1 OR LARGER, LESS THAN 0.2 | $\delta 2$ |
| ⋮ | ⋮ |
| 0.9 OR LARGER, LESS THAN 1.0 | $\delta n$ |

FIG. 8

| REGISTRATION NO. | REGISTRATION IMAGE | ADDITIONAL INFORMATION |
|---|---|---|
| 1 | G0001 | A0001 |
| 2 | G0002 | A0002 |
| ⋮ | ⋮ | ⋮ |
| 3 | G000n | A000n |

FIG. 17

| FAMILY NAME | CHARACTER DESCRIPTION POSITION | CHARACTER | USED/UNUSED |
|---|---|---|---|
| ⋮ | ⋮ | ⋮ | ⋮ |
| SAMPLE | ABOVE SEAL IMPRESSION | A | 0 |
| | | B | 0 |
| | | C | 0 |
| | | ⋮ | ⋮ |
| | | Z | 0 |
| | UPPER RIGHT OF SEAL IMPRESSION | A | 0 |
| | | ⋮ | ⋮ |
| | | Z | 0 |
| | ⋮ | ⋮ | ⋮ |
| ⋮ | ⋮ | ⋮ | ⋮ |

FIG. 22

RE-REGISTRATION GUIDE SCREEN

INDIVIDUAL IDENTIFICATION PROPERTY IS INSUFFICIENT. PLEASE PERFORM REGISTRATION OPERATION AGAIN WHILE ADDING HANDWRITTEN CHARACTER.

OBJECT MANAGEMENT SYSTEM

This application is a National Stage Entry of PCT/JP2019/024786 filed on Jun. 21, 2019, the contents of all of which are incorporated herein by reference, in their entirety.

TECHNICAL FIELD

The present invention relates to an object management system, an object management method, a program, and an object matching system.

BACKGROUND ART

Various technologies for performing registration and matching of images including patterns such as figures and characters have been proposed and put into practice.

For example, Patent Literature 1 proposes a seal impression registration device including a scanner unit for simultaneously scanning a seal impression image of a seal and registration information including a handwriting image, personal identification data, and a seal impression registration number, a file unit in which the seal impression image and the registration information read out through scanning are stored, a display unit for displaying the seal impression image and the registration information, and a control unit that controls the scanner unit, the file unit, and the display unit. According to the seal impression registration device, in the case of matching a registered seal, personal identification information such as a handwriting image and the like other than the seal can be matched simultaneously, which enables prevention of a trouble.

Patent Literature 1: JP 4-367983 A

Non-Patent Literature 1: Akiba Norimitsu and five others, "Development of semi-automated geometric image transformation programs for forensic engineering examination", Forensic Science and Technology, 20(2), 157-164 (2015)

SUMMARY

In an image in which a figure and a character formed on an object are captured from an oblique direction with use of a camera, distortion is caused by the projection. Further, the distortion caused at that time is changed according to the capturing direction by the camera at the time of capturing. As a result, even in patterns of the same figures and characters formed on the same object, when the capturing directions by the camera differ between the time of registration and the time of matching, a matching failure phenomenon occurs. Moreover, due to an influence of projection distortion, a phenomenon in which a pattern of a figure and a character formed on an object for object identification closely resembles a pattern of a figure and a character formed on another object occurs. As a result, the accuracy of object matching using an image including a figure and a character is degraded.

An object of the present invention is to provide an object management system that solves the above-described problem.

An object management system according to one aspect of the present invention is configured to include a first acquisition means for acquiring a first image in which a surface of a registration target object is captured, the surface having a first circle and a first handwritten character drawn thereon;

a first generation means for detecting a first ellipse corresponding to the first circle from the first image, and generating a registration image in which the first image is applied with projective transformation such that the first ellipse becomes a circle; and a registration means for writing the registration image into a storage means as data for determining the sameness of the registration target object.

Further, an object management method according to another aspect of the present invention is configured to include acquiring a first image in which a surface of a registration target object is captured, the surface having a first circle and a first handwritten character drawn on the surface;

detecting a first ellipse corresponding to the first circle from the first image, and generating a registration image in which the first image is applied with projective transformation such that the first ellipse becomes a circle; and writing the registration image into a storage means as data for determining the sameness of the registration target object.

Further, a computer-readable medium according to another aspect of the present invention is configured to store a program for causing a computer to perform processing of:

acquiring a first image in which a surface of a registration target object is captured, the surface having a first circle and a first handwritten character drawn on the surface;

detecting a first ellipse corresponding to the first circle from the first image, and generating a registration image in which the first image is applied with projective transformation such that the first ellipse becomes a circle; and writing the registration image into a storage means as data for determining the sameness of the registration target object.

Further, an object matching system according to another aspect of the present invention is configured to include an acquisition means for acquiring a first image in which a surface of a matching target object is captured, the surface having a first circle and a handwritten character drawn on the surface;

a generation means for detecting a first ellipse corresponding to the first circle from the first image, and generating a matching image in which the first image is applied with projective transformation such that the first ellipse becomes a circle; and a determination means for comparing the matching image with a registration image of a registration target object stored in a storage means, and determining the sameness of the matching target object and the registration target object.

With the configurations described above, the present invention is able to enhance the accuracy of object matching using an image including a figure and a character.

BRIEF DESCRIPTION OF DRAWINGS

FIG. 3 illustrates a plane projective transformation expression.

FIG. 7 illustrates an example of an eccentricity/distance δ correspondence table.

FIG. 8 illustrates exemplary contents of a registration image database.

FIG. 17 illustrates exemplary contents of a recommendation database.

FIG. 22 illustrates an example of a re-registration guide screen to be displayed on a screen display device of a mobile terminal.

EXEMPLARY EMBODIMENTS

First Exemplary Embodiment

Figure 1:
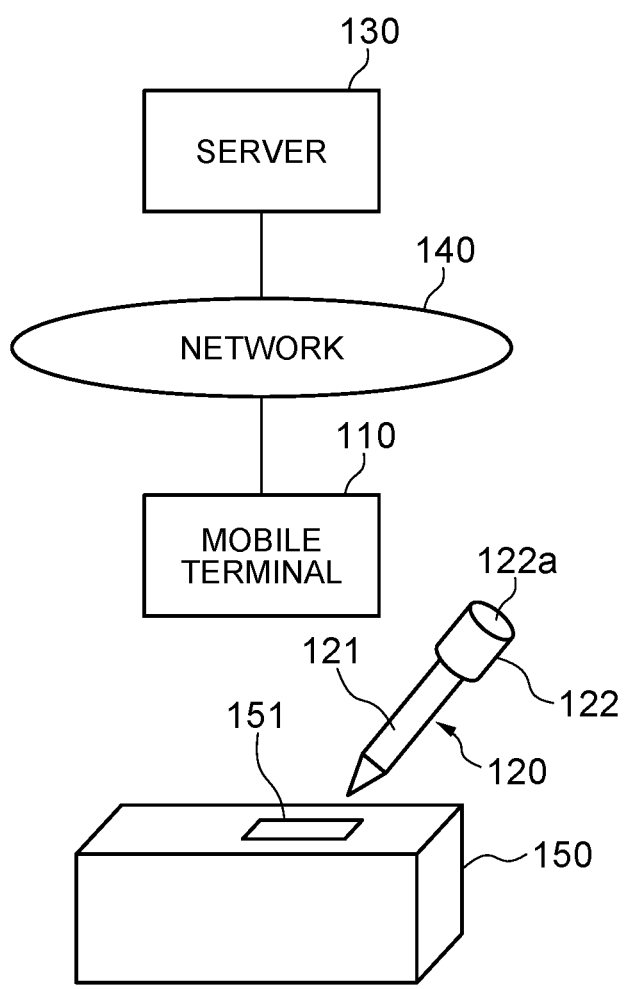
FIG. 1 is a block diagram illustrating an object management system according to a first exemplary embodiment of the present invention.

FIG. 1 is a block diagram illustrating an object management system according to a first exemplary embodiment of the present invention. An object management system 100 illustrated in FIG. 1 is a system for managing an individual of an object 150 such as a product, a merchandise, a home-delivery parcel, or the like, for source indication, quality management, distribution management, and the like.

Referring to FIG. 1, the object management system 100 is configured to include a mobile terminal 110, a seal-attached ball-point pen 120, and a server 130. The mobile terminal 110 and the server 130 are communicably connected with each other over a network 140 such as the Internet. While FIG. 1 illustrates only one mobile terminal 110, a plurality of mobile terminals 110 may be involved.

The seal-attached ball-point pen 120 is an exemplary tool for forming a seal impression and a handwritten character on a label 151 attached to a surface of the object 150 to be managed. In the present specification, handwritten characters include handwritten marks, patterns, and the like. The label 151 is one in which adhesive is applied to the rear surface of a sheet of fine quality paper having a rectangular planar shape for example, so as to be easily attachable to any surface of the object 150 by pressing the rear surface to the object 150 to be bonded. In FIG. 1, a seal impression and a handwritten character are formed on the label 151 attached to the object 150. However, it is also possible to directly form a seal impression and a handwritten character on the surface of the object 150.

The seal-attached ball-point pen 120 has a structure in which a ball-point pen 121 and a self-inking stamp 122 are integrated. In the self-inking stamp 122, ink permeates a stamp surface 122a, and when the stamp surface 122a is pressed against the surface of the label 151, a seal impression corresponding to the pattern formed on the stamp surface 122a is formed on the surface of the label 151. The self-inking stamp 122 to be used in the present embodiment is configured to form a seal impression in which a character expressing the family name of a person is surrounded by a perfect circular contour. Further, the ball-point pen 121 is used to write any character on the surface of the label 151.

Figure 2A:
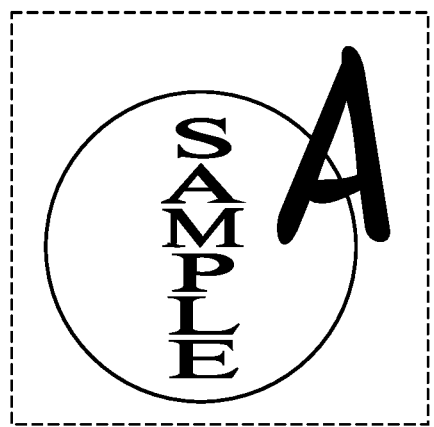
FIG. 2A illustrates an exemplary image of a label attached to an object, captured from the front.

FIG. 2A illustrates an exemplary image of the label 151 attached to the object 150, captured from the front. On the label 151 in this example, a seal impression is formed in which characters expressing the family name of a person are surrounded by a perfect circular frame. In the figure, the characters expressing the family name are "sample", for the sake of convenience. On the label 151, a handwritten character "A" is also written on the upper right of the seal impression. In the present embodiment, an image in which the seal impression and the handwritten character, formed on the label 151 attached to the object 150 as described above, are captured at the same time is used as individual identification information for identifying an individual of the object 150. By using an image in which the seal impression and the handwritten character are captured at the same time as an individual identifier as described above, it is possible to enhance the individual identification capacity compared with an image only with a seal impression or an image only with a handwritten character. Further, according to the nonuniformity in the relative positional relationship between a seal impression and a handwritten character, it is possible to further enhance the individual identification capacity.

Figure 2B:
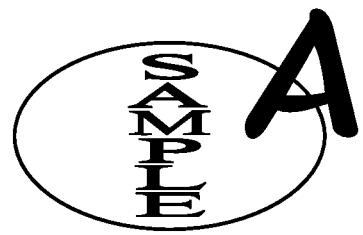
FIG. 2B illustrates an exemplary image of a label attached to an object, captured from an oblique direction.
Figure 2C:
FIG. 2C illustrates an exemplary image of a label attached to an object, captured from an oblique direction.

However, in an image in which a seal impression and a handwritten character formed on the label 151 are captured with use of a camera, distortion is caused by the projection according to the capturing direction thereof. FIG. 2B illustrates an exemplary image of the label 151 that is the same as that of FIG. 2A, captured from an oblique direction. FIG. 2C illustrates an exemplary image of the label 151 that is the same as that of FIG. 2A, captured from an oblique direction different from the direction of FIG. 2B. As illustrated in these examples, even in the case of the same seal impression and handwritten character, when the capturing directions are different, it is observed as a different image due to distortion caused by projection. Therefore, even in the case of the same seal impression and handwritten character formed on the same object 150, when the capturing directions differ between the time of registration and the time of matching, a matching failure phenomenon occurs. Moreover, due to an influence of the projection distortion, a phenomenon in which a pattern of a seal impression and a character formed on one object 150 for object identification resembles a pattern of a seal impression and a character formed on another object 150 occurs. As a result, the accuracy of object matching using an image including a seal impression and a handwritten character deteriorates.

Therefore, in the present embodiment, when performing registration and matching of an image of a seal impression and a handwritten character formed on the object matching 150, deterioration of accuracy in the object matching, caused by an influence of projection distortion, is prevented by performing registration and matching after correcting distortion caused by projection. Hereinafter, a projection distortion correction method adopted in the present embodiment will be described.

Figure 3:
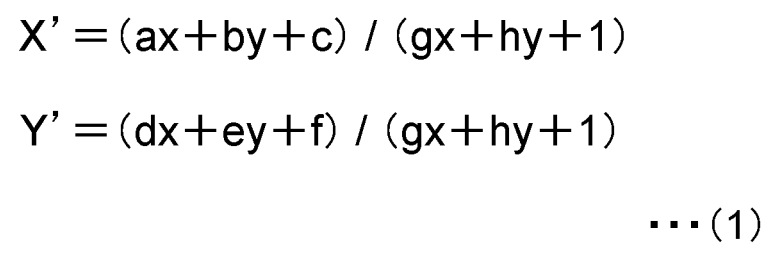

In general, plane projective transformation is expressed by Expression 1 shown in FIG. 3. In Expression 1, x and y represent coordinates before transformation, x' and Y' represent coordinates after transformation, and a, b, c, d, e, f, g, and h represent projective transformation coefficients. In order to obtain these eight projective transformation coefficients, it is only necessary to solve a simultaneous equation with eight unknown in which coordinates of four points before and after the transformation are substituted in Expression 1. In the present embodiment, by using a fact that a circle that is a contour of a seal impression drawn on a plane is shown as an ellipse when it is imaged from an oblique direction, an ellipse is detected from an image, and projective transformation coefficients are obtained by substituting the coordinates of four points on the detected ellipse before and after transformation in Expression 1. Then, as the four points, four vertexes of a square in internal contact with the original circle are used.

Figure 4:
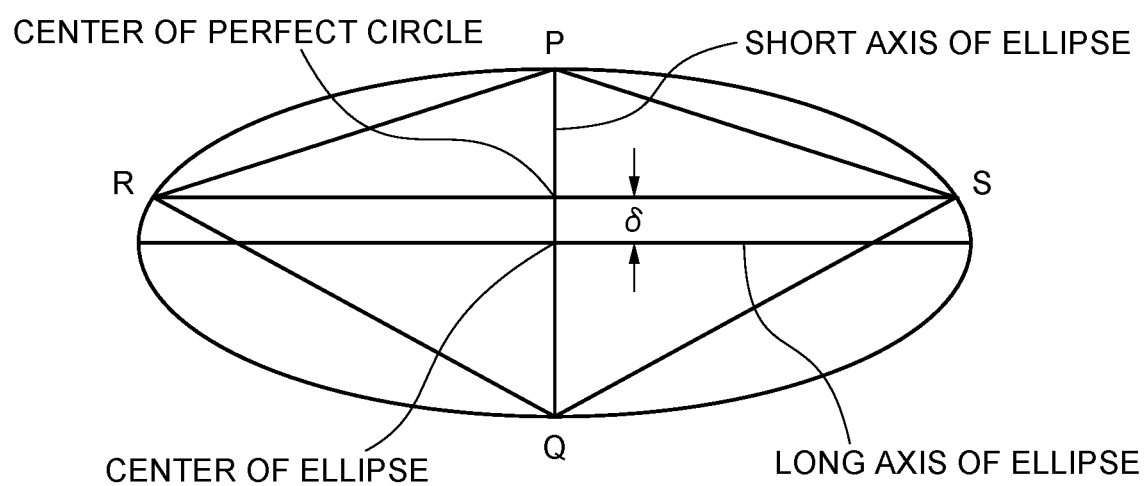
FIG. 4 is a schematic diagram illustrating a relationship between an ellipse obtained when a perfect circle drawn on a plane is captured from an oblique direction and a square in internal contact with the original perfect circle.

FIG. 4 is a schematic diagram illustrating a relationship between an ellipse obtained when imaging a perfect circle drawn on a plane from an oblique direction and a square in internal contact with the original perfect circle. The square in internal connected with the original perfect circle is a square in which two vertexes P and Q, facing each other, coincide with both end points of a short axis of the ellipse. At that time, the remaining two vertexes R and S of the square do not coincide with both end points of a long axis of the ellipse. This is because the center of an ellipse when viewed from an oblique direction does not generally coincide with the center of the original circle. That is, the center of the original perfect circle moves in a depth direction of the short axis by a distance δ. Therefore, there is a problem how to calculate the remaining two vertexes R and S of the square.

Regarding this problem, Non-Patent Literature 1 describes a method in which contact points where a straight line, running through an intersection point between the vanishing line on the image and an extended line of the short axis of the ellipse, contacts the ellipse are calculated as the vertexes R and S. However, in this method, in order to determine the vanishing line on the image, it is necessary to obtain at least two vanishing points on the image. Since vanishing points cannot be obtained only with a circle, it is necessary to describe a figure such as a parallelogram besides the circle on the object.

Therefore, the present embodiment solves the problem by handling a distance δ between the center of the ellipse when the circle is viewed from the oblique direction and the center of the original circle as a variable that depends on the feature amount of the ellipse, and calculating by means of a statistical method and storing it in advance for various ellipses having different feature amounts. In the present embodiment, as a feature amount of an ellipse, an eccentricity is used. However, the feature amount of an ellipse is not limited to the eccentricity. Another feature amount such as an oblateness may be used. Further, as the distance δ, a ratio with respect to a predetermined length serving as a reference, rather than an absolute value, is used. In the present embodiment, the length of a short axis of an ellipse is used as a length serving as a reference. However, the length serving as a reference is not limited to a short axis, and a long axis of the ellipse or the like may be used. The details of a method of obtaining the distance δ in advance will be described later.

Referring to FIG. 1 again, the mobile terminal 110 is a mobile-type terminal such as a smartphone to be used for registration and matching of an object to be managed.

Figure 5:
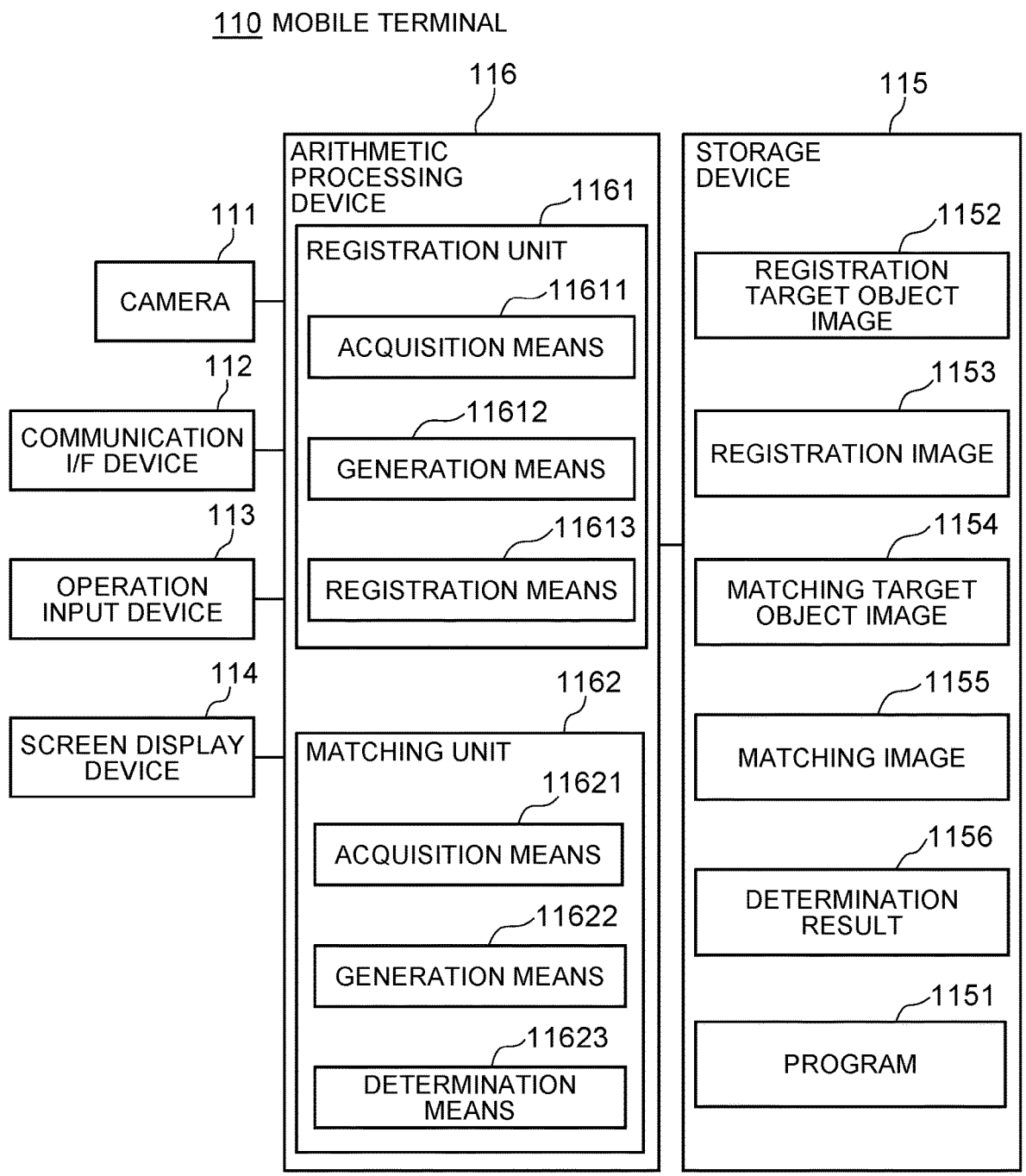
FIG. 5 is a block diagram of a mobile terminal of the object management system according to the first exemplary embodiment of the present invention.

FIG. 5 is a block diagram of the mobile terminal 110. Referring to FIG. 5, the mobile terminal 110 includes a camera 111, a communication interface (I/F) unit 112, an operation input device 113, a screen display device 114, a storage device 115, and an arithmetic processing device 116.

The camera 111 is an imaging device that images an object to be managed. The camera 111 may be a visible-light color camera equipped with a charge-coupled device (CCD) image sensor or a complementary MOS (CMOS) image sensor having a pixel capacity of about several millions pixels, for example. The camera 111 has a fixed diaphragm value and a focal distance.

The communication I/F device 112 is configured of a data communication circuit, and is configured to perform data communication wirelessly with an external device such as a server 130. The operation input device 113 is configured of devices such as a keyboard and a mouse, and is configured to detect operation by an operator and output it to the arithmetic processing device 116. The screen display device 114 is configured of a device such as a liquid crystal display (LCD), and is configured to display, on the screen, various types of information according to an instruction from the arithmetic processing device 116.

The storage device 115 is configured of storage devices such as a hard disk and a memory, and is configured to store therein processing information and a program 1151 necessary for various types of processing in the arithmetic processing device 116. The program 1151 is a program for implementing various processing units by being read and executed by the arithmetic processing device 116, and is read in advance from an external device or a storage medium via a data input-output function of the communication I/F device 112 and is stored in the storage device 115. The main processing information stored in the storage device 115 includes a registration target object image 1152, a registration image 1153, a matching target object image 1154, a matching image 1155, and a determination result 1156.

The registration target object image 1152 is an image of the label 151 attached to the object to be registered, captured by the camera 111.

The registration image 1153 is the registration target object image 1152 in which the distortion caused by projection has been corrected. The registration image 1153 is registered in the server 130 as data for determining sameness of an object to be registered.

The matching target object image 1154 is an image of the label attached to the object to be matched, captured by the camera 111. When the imaging direction of the camera 111 is tilted, distortion caused by projection is generated in the matching target object image 1154, similar to the case of the registration target object image 1152.

The matching image 1155 is the matching target object image 1154 in which distortion caused by projection has been corrected.

The determination result 1156 is data representing whether the matching target object specified by the matching image 1155 is the same as any registration target object having been registered in the server 130.

The arithmetic processing device 116 has a processor such as an MPU and the peripheral circuits thereof, and is configured to read and execute the program 1151 from the storage device 115 to allow the hardware and the program 1151 to cooperate with each other to thereby implement the various processing units. The main processing units to be implemented by the arithmetic processing device 116 is a registration unit 1161 and a matching unit 1162.

The registration unit 1161 is configured to generate registration data including a registration image for determining the sameness of an object to be registered, and transmit it to the server 130. The registration unit 1161 is configured to include an acquisition means 11611, a generation means 11612, and a registration means 11613.

The acquisition means 11611 is configured to acquire an image of an object to be registered from the camera 111, and store it in the storage device 115 as the registration target object image 1152.

The generation means 11612 is configured to read the registration target object image 1152 from the storage device 115, and detect an ellipse corresponding to the contour of the seal impression from the image 1152. The generation means 11612 is also configured to generate an image in which the image 1152 is applied with projective transformation so as to make the detected ellipse become a perfect circle as the registration image 1153, and store it in the storage device 115. Note that the generation means 11612 may be configured to extract, from an image in which the image 1152 is applied with projective transformation so as to make the ellipse become a perfect circle, a partial area having a predetermined size that is determined with reference to the center of the perfect circle, as the registration image 1153.

The registration means 11613 is configured to input additional information according to registration from the operation input device 113. The additional information is not limited if it is information related to an object to be registered. The additional information may include information indicating a management number of the object to the registered, registration date and time, and the content of the object, for example. Further, the registration means 11613 is configured to read out the registration image 1153 from the storage device 115, create registration data including the registration image 1153 and the input additional information, and transmit it to the server 130 via the communication I/F device 112.

The matching unit 1162 is configured to determine whether or not a matching target object is the same as the registration target object registered in the server 130. The matching unit 1162 is configured to include an acquisition means 11621, a generation means 11622, and a determination means 11623.

The acquisition means 11621 is configured to acquire an image in which a matching target object is captured from the camera 111, and store it in the storage device 115 as the matching target object image 1154.

The generation means 11622 is configured to read the matching target object image 1154 from the storage device 115, and detect an ellipse corresponding to the contour of the seal impression from the image 1154. The generation means 11622 is also configured to generate an image in which the image 1154 is applied with projective transformation so as to make the detected ellipse become a perfect circle as the matching image 1155, and store it in the storage device 115. Note that the generation means 11622 may be configured to extract, from an image in which the image 1154 is applied with projective transformation so as to make the ellipse become a perfect circle, a partial area having a predetermined size that is determined with reference to the center of the perfect circle, as the matching image 1155.

The determination means 11623 is configured to read the matching image 1155 from the storage device 115. The determination means 11623 is also configured to transmit an acquisition request of registration data to the server 130 via the communication I/F device 112, and receive registration data, that is a response to the acquisition request, from the server 130 via the communication I/F device 112. The determination means 11623 compares, for each piece of the received registration data, the registration image included in the registration data with the matching image 1155 to thereby determine whether or not the matching target object according to the matching image 1155 is the same as the registration target object according to the registration data. Further, the determination means 11623 is configured to, when determining that the matching target object according to the matching image 1155 is the same as any registration target object, create the determination result 1156 including the additional information included in the registration data of the registration target object determined to be the same, and store it in the storage device 115. The determination means 11623 is also configured to, when determining that the matching target object according to the matching image 1155 is not the same as any registration target object, create the determination result 1156 indicating that the same registration target object does not exist, and store it in the storage device 115. The determination means 11623 is also configured to read out the determination result 1156 from the storage device 115, display it on the screen of the screen display device 114, or/and transmit it to an external terminal via the communication I/F device 112.

Figure 6:
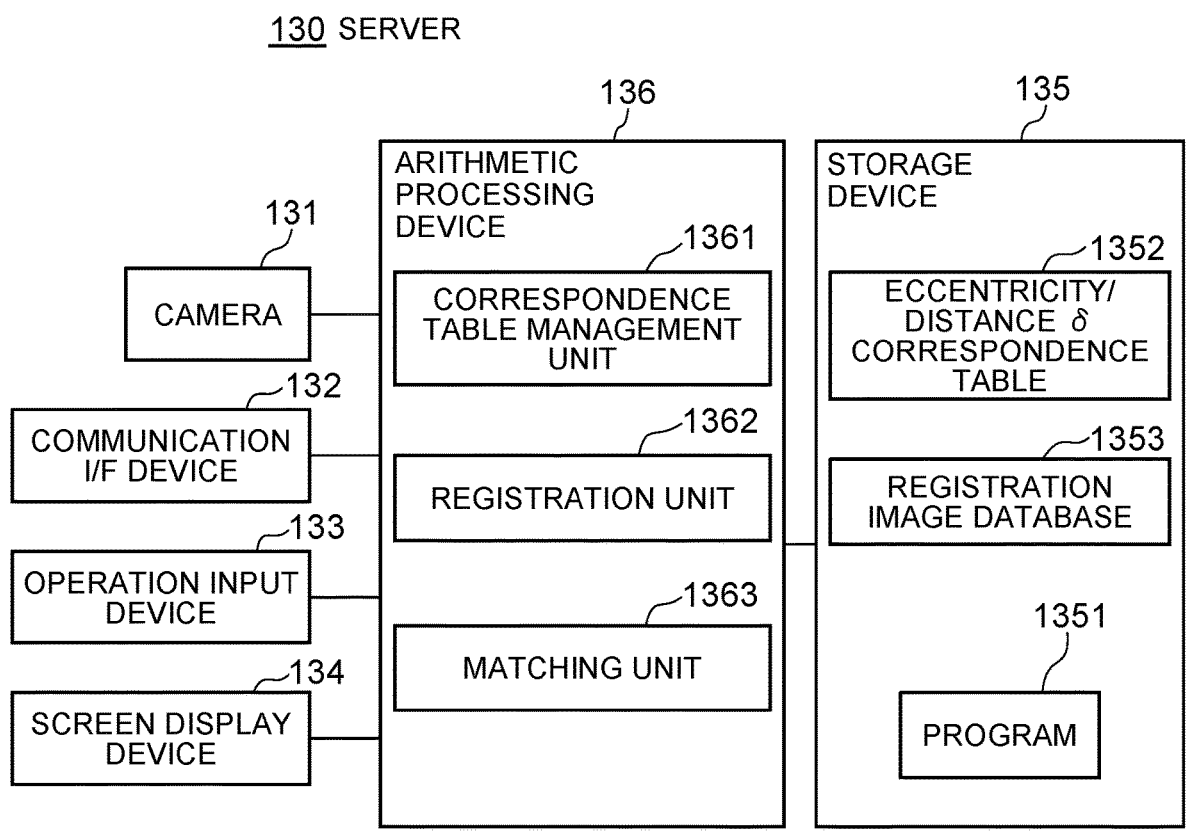
FIG. 6 is a block diagram of a server of the object management system according to the first exemplary embodiment of the present invention.

FIG. 6 is a block diagram of the server 130. Referring to FIG. 6, the server 130 includes a camera 131, a communication interface (I/F) device 132, an operation input device 133, a screen display device 134, a storage device 135, and an arithmetic processing device 136.

The camera 131 is a camera having the same specification as that of the camera 111 of the mobile terminal 110. The communication I/F device 132 is configured of a data communication circuit, and is configured to perform data communication wirelessly with an external device such as the mobile terminal 110. The operation input device 133 is configured of devices such as a keyboard and a mouse, and is configured to detect operation by an operator and output it to the arithmetic processing device 136. The screen display device 134 is configured of a device such as an LCD, and is configured to display, on the screen, various types of information according to an instruction from the arithmetic processing device 136.

The storage device 135 is configured of storage devices such as a hard disk and a memory, and is configured to store therein processing information and a program 1351 necessary for various types of processing in the arithmetic processing device 136. The program 1351 is a program for implementing various processing units by being read and executed by the arithmetic processing device 136, and is read in advance from an external device or a storage medium via a data input-output function of the communication I/F device 132 or the like, and is stored in the storage device 135. The main processing information stored in the storage device 135 includes an eccentricity/distance δ correspondence table 1352 and a registration image database 1353.

The eccentricity/distance δ correspondence table 1352 is configured to store the correspondence relationship between the eccentricity of the ellipse described with reference to FIG. 4 and the distance δ. FIG. 7 illustrates an example of the eccentricity/distance δ correspondence table 1352. The eccentricity/distance δ correspondence table 1352 of this example consists of a plurality of entries, and one entry includes an eccentricity range field and a distance δ field. In the eccentricity range field and the distance δ field of the same entry, one eccentricity range when the eccentricity that is 0 or larger and less than 1 is divided into a plurality of eccentricity ranges, and the distance δ corresponding to such an eccentricity range, are set. Any method may be used for dividing the eccentricity that is 0 or larger and less than 1 into a plurality of eccentricity ranges. For example, in FIG. 4, the eccentricity that is 0 or larger and less than 1 is uniformly divided by 0.1 to obtain an eccentricity range between 0 or larger and less than 0.1, an eccentricity range between 0.1 or larger and less than 0.2, . . . , and an eccentricity range between 0.9 or larger and less than 1.0. However, the unit of dividing it is not limited to 0.1. Moreover, the eccentricity that is 0 or larger and less than 1 may be divided to have nonuniform ranges.

The registration image database 1353 is configured to store an image of a registration target object and additional information. FIG. 8 illustrates exemplary contents of the registration image database 1353. The registration image database 1353 of this example is formed of a plurality of entries, and one entry includes a registration number field, a registration image field, and an additional information field. In the registration image field and the additional information field of the same entry, a registration image and additional information of one registration target object are stored. In the registration number field, a serial number for uniquely identifying the entry or the like is stored.

The arithmetic processing device 136 has a processor such as an MPU and the peripheral circuits thereof, and is configured to read and execute the program 1351 from the storage device 135 to allow the hardware and the program 1351 to cooperate with each other to thereby implement the various processing units. The main processing units to be implemented by the arithmetic processing device 136 includes a correspondence table management unit 1361, a registration unit 1362, and a matching unit 1363.

The correspondence table management unit 1361 is configured to generate a correspondence table showing a correspondence relationship between the eccentricity of the ellipse and the distance δ, on the basis of a result of analyzing a plurality of images of a circle drawn on a plane, captured by the camera 131 from various angles, and store it as the eccentricity/distance δ correspondence table 1352 in the storage device 135. The correspondence table management unit 1361 is also configured to, when receiving an acquisition request of the distance δ from the mobile terminal 110 designating the eccentricity of the ellipse, search the eccentricity/distance δ correspondence table 1352, and transmit the corresponding distance δ to the mobile terminal 110.

The registration unit 1362 is configured to, when receiving a registration request of registration data from the mobile terminal 110 via the communication I/F device 132, secure one vacant entry in the registration image database 1353, and store the registration image and the additional information included in the received registration request in the registration image field and the additional information field of the vacant entry. The registration unit 1362 is also configured to adopt a new registration number and store it in the registration number field of the vacant entry.

The matching unit 1363 is configured to, when receiving an acquisition request of registration data from the mobile terminal 110 via the communication I/F device 132, read out the registration data registered in each entry of the registration image database 1353, and transmit it to the mobile terminal 110 via the communication I/F device 132.

Next, operation of the object management system 100 according to the present exemplary embodiment will be described. The operation of the object management system 100 is largely divided into pre-operation, registration operation, and matching operation. The pre-operation is an operation of creating the eccentricity/distance δ correspondence table 1352. The registration operation is an operation of registering an image of a registration target object as a registration image. The matching operation is an operation of matching an image of a matching target object with a registration image.

First, the pre-operation of creating the eccentricity/distance δ correspondence table 1352 will be described. The pre-operation is performed by an operator of the server 130 and the correspondence table management unit 1361, prior to the registration operation and the matching operation.

Figure 9:
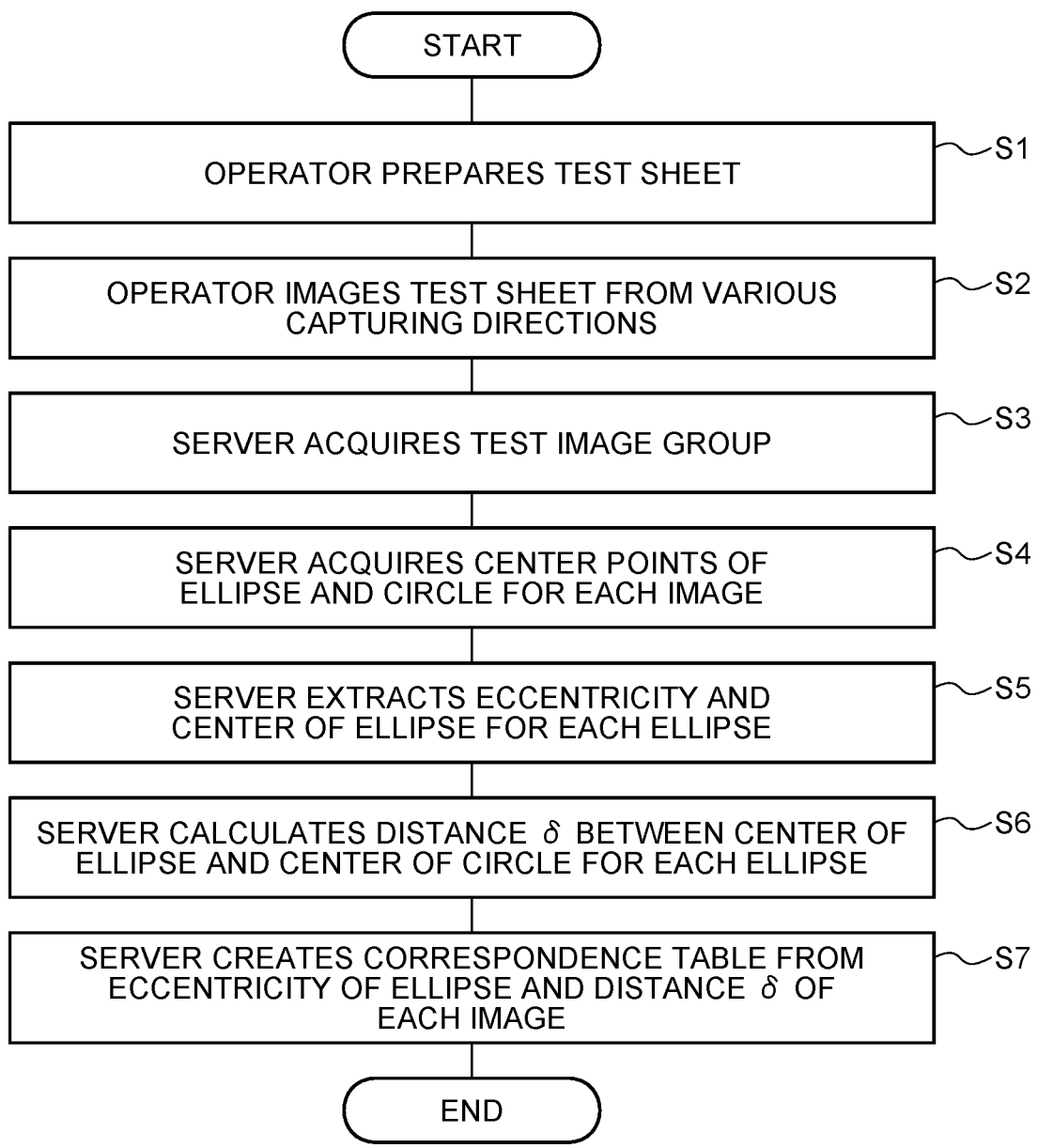
FIG. 9 is a flowchart showing an exemplary procedure of creating an eccentricity/distance δ correspondence table.
Figure 10:
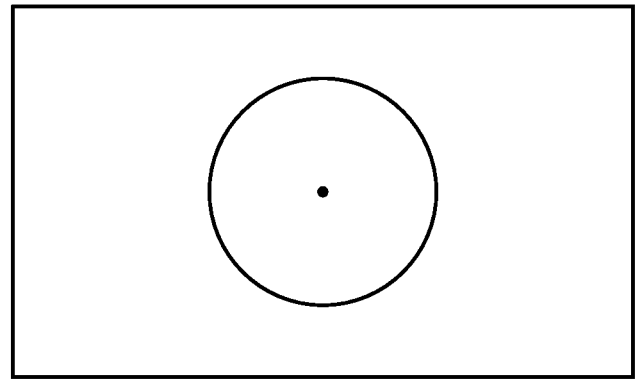
FIG. 10 is a plan view illustrating an example of a test sheet in which a circle and a center point of the circle are drawn in a color different from the background color.

FIG. 9 is a flowchart showing an exemplary procedure of creating the eccentricity/distance δ correspondence table 1352. First, the operator prepares a sheet of paper in which a circle and the center point of the circle are drawn in a color different from the background color (step S1). Hereinafter, such a sheet is referred to as a test sheet. FIG. 10 is a plan view of an exemplary test sheet. The circle drawn on the test sheet is assumed to be the contour of a seal. Therefore, the diameter of the circle drawn on the test sheet is equal to the diameter of the contour of a general seal. However, the diameter of the circle may be longer or shorter than the diameter of the contour of a general seal. Further, it is assumed that the center point of the circle drawn on the test sheet is a dot.

Then, the operator places the test sheet on a flat table with the surface on which the circle is drawn facing upward, and repeatedly capturing images of the test sheet a plurality of times with use of the camera 131 by changing the capturing direction such that the circle is shown at almost the center (step S2). In response to the capturing, the correspondence table management unit 1361 acquires the captured images of the test sheet from the camera 131 as test images, and stores them temporarily (step S3). In order to entirely capture the state where the circle is changed to ellipses of various eccentricities due to an influence of projection, it is desirable to change the capturing direction of the camera so as to cover the direction directly confronting the test sheet to the direction almost horizontal with respect to the surface of the test sheet. For the capturing, the operator may set the camera 131 to a still image mode, and repeat operation of capturing still images from various capturing directions. At that time, the correspondence table management unit 1361 acquires one of the still images captured by the camera 131 as a test image. Further, the operator may set the camera 131 to a video mode, and capture the video while changing the capturing direction variously. In that case, the correspondence table management unit 1361 acquires one frame image of the video captured by the camera 131 as a test image.

Then, the correspondence table management unit 1361 extracts an ellipse and a center point of a circle for each test image (step S4). For example, the correspondence table management unit 1361 extracts an ellipse by applying an ellipse onto a sequence of points extracted from the test image. That is, an equation of an ellipse existing in the image is obtained. However, another ellipse detection method such as a Hough-transformation may be used. The correspondence table management unit 1361 also extracts a dot existing inside the extracted ellipse as a center point.

Then, the correspondence table management unit 1361 calculates the feature amount (eccentricity in this example) of the ellipse and the center of the ellipse for each test image (step S5). Then, for each test image, the correspondence table management unit 1361 calculates the distance δ between the center of the ellipse and the center of the circle on the test image (step S6). Then, the correspondence table management unit 1361 creates the eccentricity/distance δ correspondence table 1352 from the eccentricity of the ellipse and the distance δ calculated for each test image, and stores it in the storage device 135 (step S7). For example, the correspondence table management unit 1361 first classifies the pairs of the eccentricity and the distance δ calculated for the respective test images into groups of eccentricity ranges, on the basis of the eccentricity of the ellipse. Then, for each group, the correspondence table management unit 1361 calculates an average value of the distance δ of the pair belonging to the group, and creates the average value and the eccentricity range of such a group as the distance δ and the eccentricity range of one entry of the eccentricity/distance δ correspondence table 1352.

Figure 11:
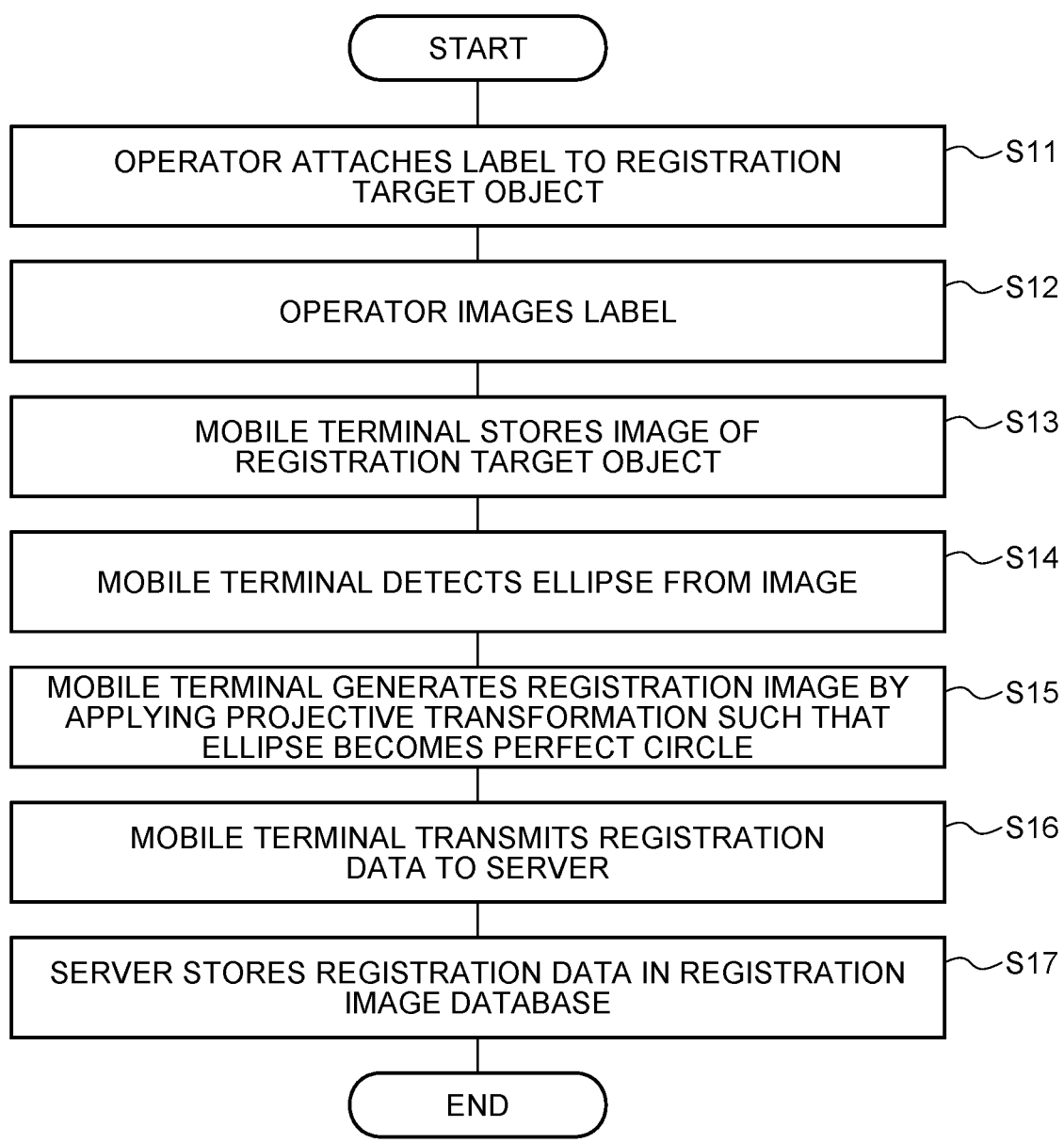
FIG. 11 is a flowchart showing an exemplary procedure of registration operation in the first exemplary embodiment of the present invention.

Next, the registration operation will be described. FIG. 11 is a flowchart showing an exemplary procedure of the registration operation. First, an operator of the mobile terminal 110 attaches the label 151 on which a seal impression and a handwritten character are described with use of the seal-attached ball-point pen 120, to the object 150 to be registered (step S11). Then, the operator operates the mobile terminal 110 to capture an image of the label 151 with the camera 111 such that the seal impression and the handwritten character on the label 151 are shown at almost the center (step S12). In response to it, the acquisition means 11611 of the registration unit 1161 of the mobile terminal 110 acquires the captured image of the label 151 from the camera 111, and stores it in the storage device 115 as the registration target object image 1152 (step S13).

Then, the generation means 11612 of the registration unit 1161 of the mobile terminal 110 reads out the registration target object image 1152 from the storage device 115, and detects an ellipse corresponding to the contour of the seal impression from the image (step S14). For example, the generation means 11612 extracts an ellipse by applying an ellipse onto a sequence of points extracted from the registration target object image 1152. That is, an equation of an ellipse existing in the image is obtained. However, another ellipse detection method such as a Hough-transformation may be used. Then, the generation means 11612 generates an image in which the entire registration target object image 1152 is applied with projective transformation so as to make the detected ellipse become a perfect circle as the registration image 1153, and stores it in the storage device 115 (step S15). Then, the registration means 11613 of the registration unit 1161 of the mobile terminal 110 inputs therein additional information related to registration from the operator via the operation input device 113, creates a registration request including the registration image 1153 read out from the storage device 115 and the input additional information, and transmits it to the server 130 via the communication I/F device 112 (step S16). The registration unit 1362 of the server 130 receives the registration request from the mobile terminal 110 via the communication I/F device 132, and stores it in the registration image database 1353 as new registration data (step S17).

Figure 12:
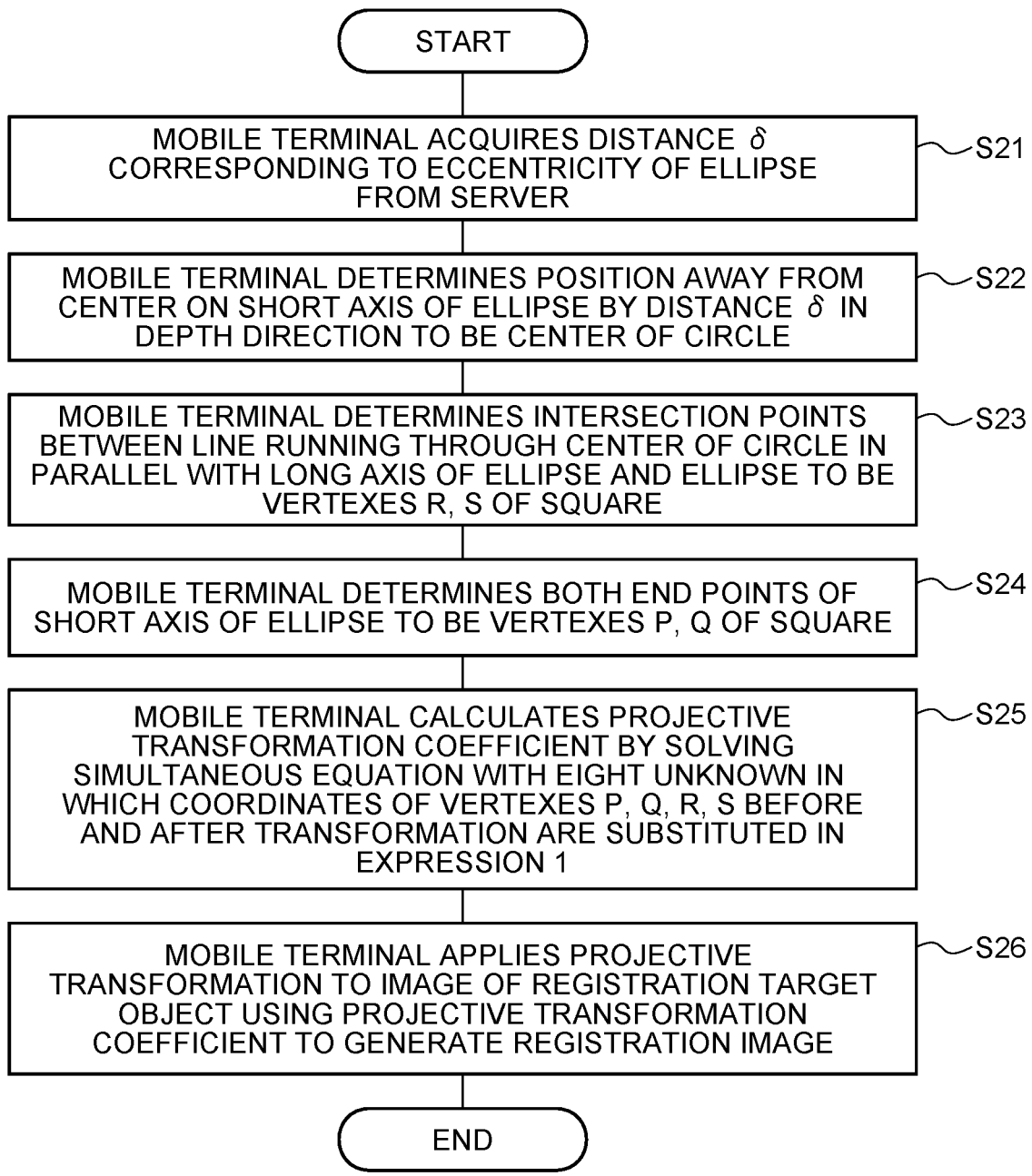
FIG. 12 is a flowchart showing an example of a detailed procedure of step S15.

FIG. 12 is a flowchart showing the details of step S15 of FIG. 11. Referring to FIG. 12, first, the generation means 11612 of the mobile terminal 110 calculates the eccentricity of the ellipse detected at step S14, and acquires the distance δ corresponding to the eccentricity from the server 130 (step S21). Specifically, the generation means 11612 first transmits an acquisition request of the distance δ including the eccentricity to the server 130 via the communication I/F device 112. The correspondence table management unit 1361 of the server 130 acquires the distance δ from the entry of the eccentricity/distance δ correspondence table 1352 in which the eccentricity included in the acquisition request received from the mobile terminal 110 is within the eccentricity range, and transmits the acquisition result including the distance δ to the mobile terminal 110 via the communication I/F device 132. The generation means 11612 of the mobile terminal 110 acquires the distance δ from the received acquisition result.

Then, assuming that the ellipse extracted from the registration target object image 1152 is an ellipse illustrated in FIG. 4, the generation means 11612 determines the position away from the center of the ellipse by the distance δ in the depth direction of the short axis of the ellipse to be the center of the original circle (step S22). Then, the generation means 11612 determines the intersection points between a straight line running through the center of the original circle in parallel with the long axis of the ellipse and the ellipse to be two vertexes R and S of the square in internal contact with the original circle (step S23). Then, the generation means 11612 determines both end points of the short axis of the ellipse to be two vertexes P and Q of the square in internal contact with the original circle (step S24). Then, the generation means 11612 calculates projective transformation coefficients by solving the simultaneous equation with eight unknown in which coordinates of the vertexes P, Q, R, and S before and after the transformation are substituted in Expression 1 (step S25). Then, with use of the calculated projective transformation coefficients, the generation means 11612 applies projective transformation to the entire registration target object image 1152 to generate the registration image 1153 (step S26).

Figure 13:
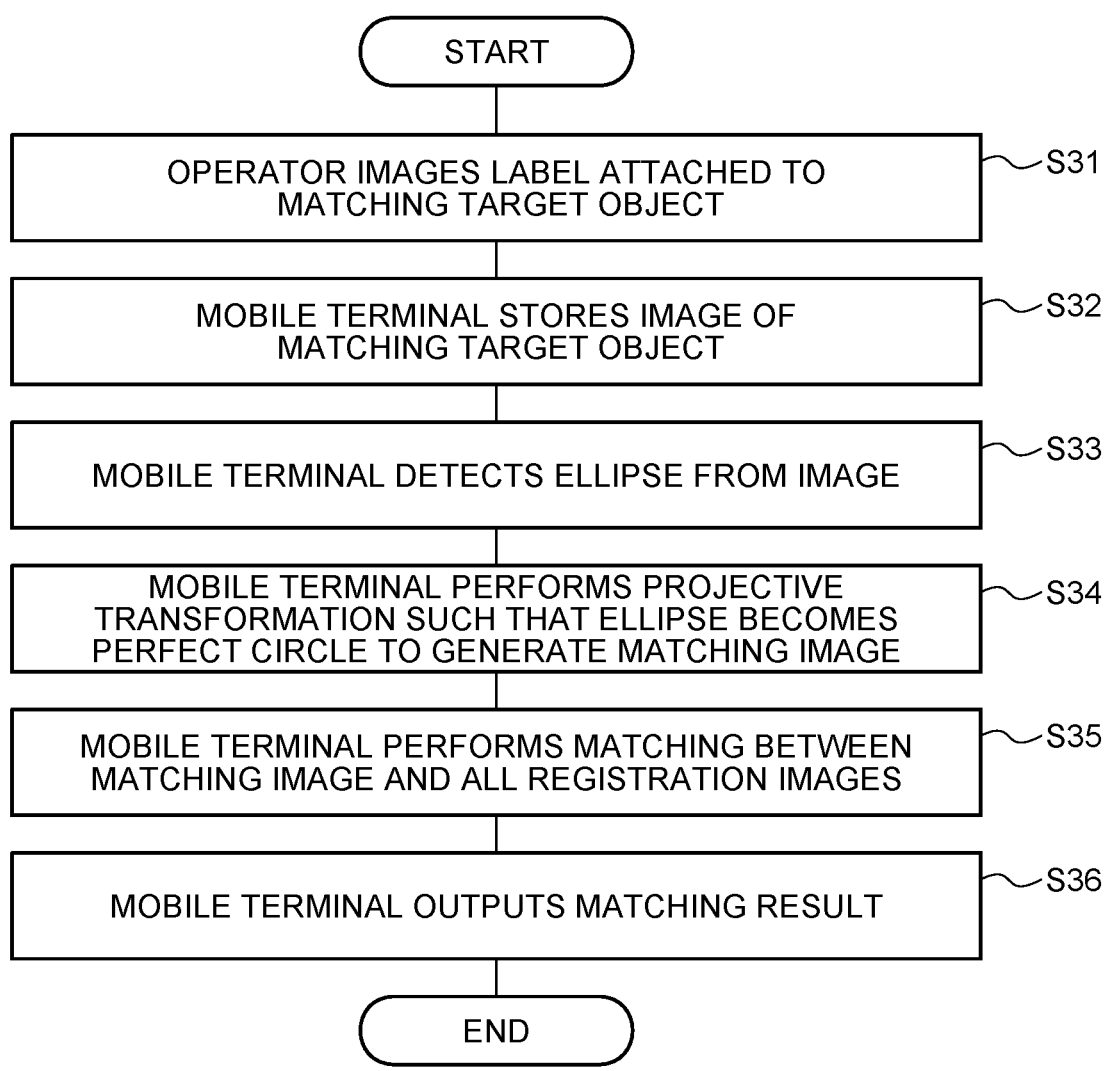
FIG. 13 is a flowchart showing an exemplary procedure of matching operation in the first exemplary embodiment of the present invention.

Next, the matching operation will be described. FIG. 13 is a flowchart showing an exemplary procedure of the matching operation. First, the operator of the mobile terminal 110 operates the mobile terminal 110 to capture an image of the label 151 with the camera 111 such that the seal impression and the handwritten character on the label 151 attached to the matching target object are shown at almost the center (step S31). In response to it, the acquisition means 11621 of the matching unit 1162 of the mobile terminal 110 acquires the captured image of the label 151 from the camera 111, and stores it in the storage device 115 as the matching target object image 1154 (step S32).

Then, the generation means 11622 of the matching unit 1162 of the mobile terminal 110 reads out the matching target object image 1154 from the storage device 115, and detects an ellipse corresponding to the contour of the seal impression from the image by means of the same method as that used by the generation means 11612 of the registration unit 1161 (step S33). Then, the generation means 11622 generates an image in which the entire matching target object image 1154 is applied with projective transformation so as to make the detected ellipse become a perfect circle as the matching image 1155 by means of the same method as that used by the generation means 11612 of the registration unit 1161, and stores it in the storage device 115 (step S34).

Then, the determination means 11623 of the matching unit 1162 of the mobile terminal 110 reads out the matching image 1155 from the storage device 115, and compares the matching image 1155 with the registration image registered in the server 130 to determine the sameness of the matching target object and the registration target object, and stores the determination result 1156 in the storage device 115 (step S35). Specifically, the determination means 11623 first transmits an acquisition request of the registration data to the server 130 via the communication I/F device 112. When receiving the acquisition request from the mobile terminal 110 via the communication I/F device 132, the matching unit 1363 of the server 130 reads out the entire registration data registered in the registration image database 1353, and transmits it to the mobile terminal 110 via the communication I/F device 132. When receiving the entire registration data transmitted from the server 130 via the communication I/F device 112, for each piece of the registration data, the determination means 11623 compares the registration image included in the registration data with the matching image 1155 to perform object matching. Then, the determination means 11623 reads out the determination result 1156 from the storage device 115, displays it on the screen display device 114, or/and transmits it to an external device via the communication I/F device 112 (step S36).

Figure 14:
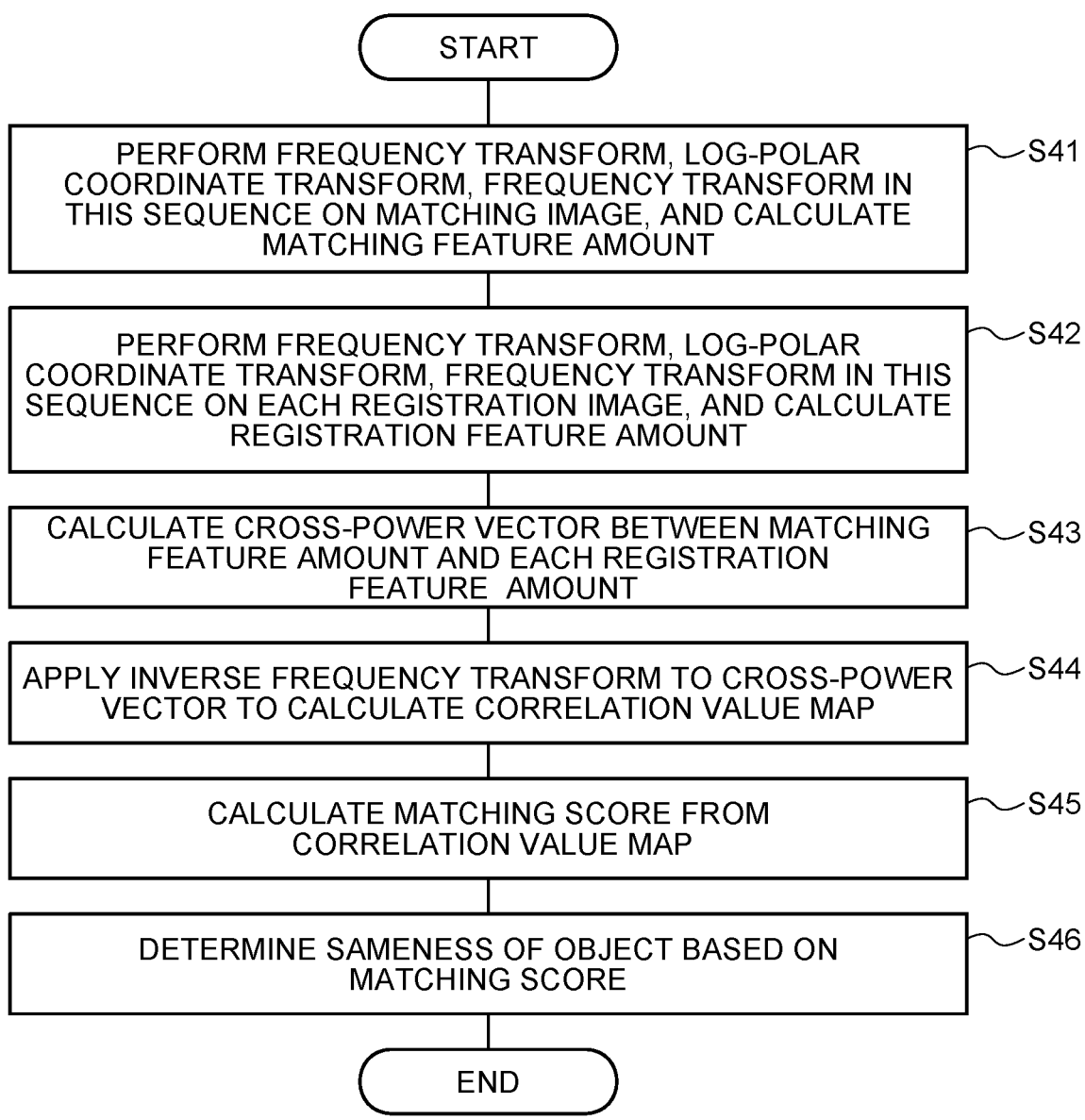
FIG. 14 is a flowchart showing an example of a detailed procedure of step S34.

FIG. 14 is a flowchart showing an exemplary procedure of matching the matching image and the registration image. Referring to FIG. 14, the determination means 11623 performs frequency transform, polar transform or log-polar coordinate transform, and frequency transform, in this sequence, on the matching image to calculate the matching feature amount (step S41). An image obtained by applying frequency transform such as Fourier transform to the matching image is called a frequency spectrum image. The feature amount obtained by applying polar transform or log-polar coordinate transform to the frequency spectrum image is called Fourier-Mellin feature. The feature amount obtained by applying frequency transform such as Fourier transform to the Fourier-Mellin feature is called a Fourier-Mellin frequency spectrum image. The Fourier-Mellin frequency spectrum image is unchanged with respect to magnification, rotation, and parallel movement of the captured image.

Then, the determination means 11623 performs frequency transform, polar transform or log-polar coordinate transform, and frequency transform in this sequence, as similar to the case of a matching image, on each registration image to calculate the registration feature amount (step S42). Then, the determination means 11623 calculates cross power spectrum between the matching feature amount and each registration feature amount (step S43). Then, the determination means 11623 calculates a correlation value map by applying inverse frequency transform to each cross power spectrum (step S44). Then, the determination means 11623 calculates each matching score representing the similarity between the matching image and each registration image from each correlation value map (step S45). Then, the determination means 11623 determines the sameness of the object on the basis of the matching score (step S46). For example, when the maximum value of the matching score is equal to or larger than a threshold, the determination means 11623 determines that the object in the matching image is the same as the object specified by the additional information included in the registration data including the registration image having the matching score of the maximum value. Meanwhile, when the maximum value of the matching score is not equal to or larger than the threshold, the determination means 11623 determines that the object in the matching image is not registered.

Next, advantageous effects of the present embodiment will be described.

According to the present embodiment, accuracy of object matching by an image including a seal impression and a handwritten character can be enhanced. This is because when performing registration and matching of a seal impression and a handwritten character formed on the object 150, the object management system 100 performs registration and matching after correcting distortion caused by projection.

Moreover, according to the present embodiment, distortion caused by projection can be corrected even if a label whose coordinates are known is not on the object. This is because in the object management system 100, by using the fact that a circle that is a contour of a seal impression drawn on a plane is shown as an ellipse when it is captured from an oblique direction, an ellipse is detected from an image, and it is applied with projective transformation such that the detected ellipse becomes a circle.

Moreover, according to the present embodiment, even if a figure such as a parallelogram for obtaining vanishing points on the image does not exist on the object, it is possible to obtain the center of a perfect circle of a seal impression in the image. This is because the object management system 100 calculates, for each of a plurality of images in which a perfect circle is captured from various angles, the feature amount (in this example, eccentricity) of an ellipse corresponding to the circle in the image and the distance δ between the center point of the ellipse and a point in the image corresponding to the center, and holds an eccentricity/distance δ correspondence table in which the feature amount of the ellipse and the distance δ are stored previously in association with each other.

Furthermore, according to the present embodiment, robust object matching can be performed with respect to rotation. This is because a matching score showing the similarity between a matching image and a registration image is calculated with use of a Fourier-Mellin frequency spectrum image that is unchanged with respect to magnification, rotation, and parallel movement.

Second Exemplary Embodiment

Next, an object management system according to a second exemplary embodiment of the present invention will be described. An object management system 200 according to the present embodiment differs from the object management system 100 of the first exemplary embodiment in having a function of presenting, to an operator, a recommendation for the type and description position of a character to be handwritten on the label 151 attached to the registration target object 150. The other aspects are the same as those of the object management system 100 of the first exemplary embodiment. The description position of a character is defined with reference to the seal impression. Specifically, the position may be above, on the upper right, right, lower right, below, on the lower left, left, upper left, or the like of the seal impression.

Figure 15:
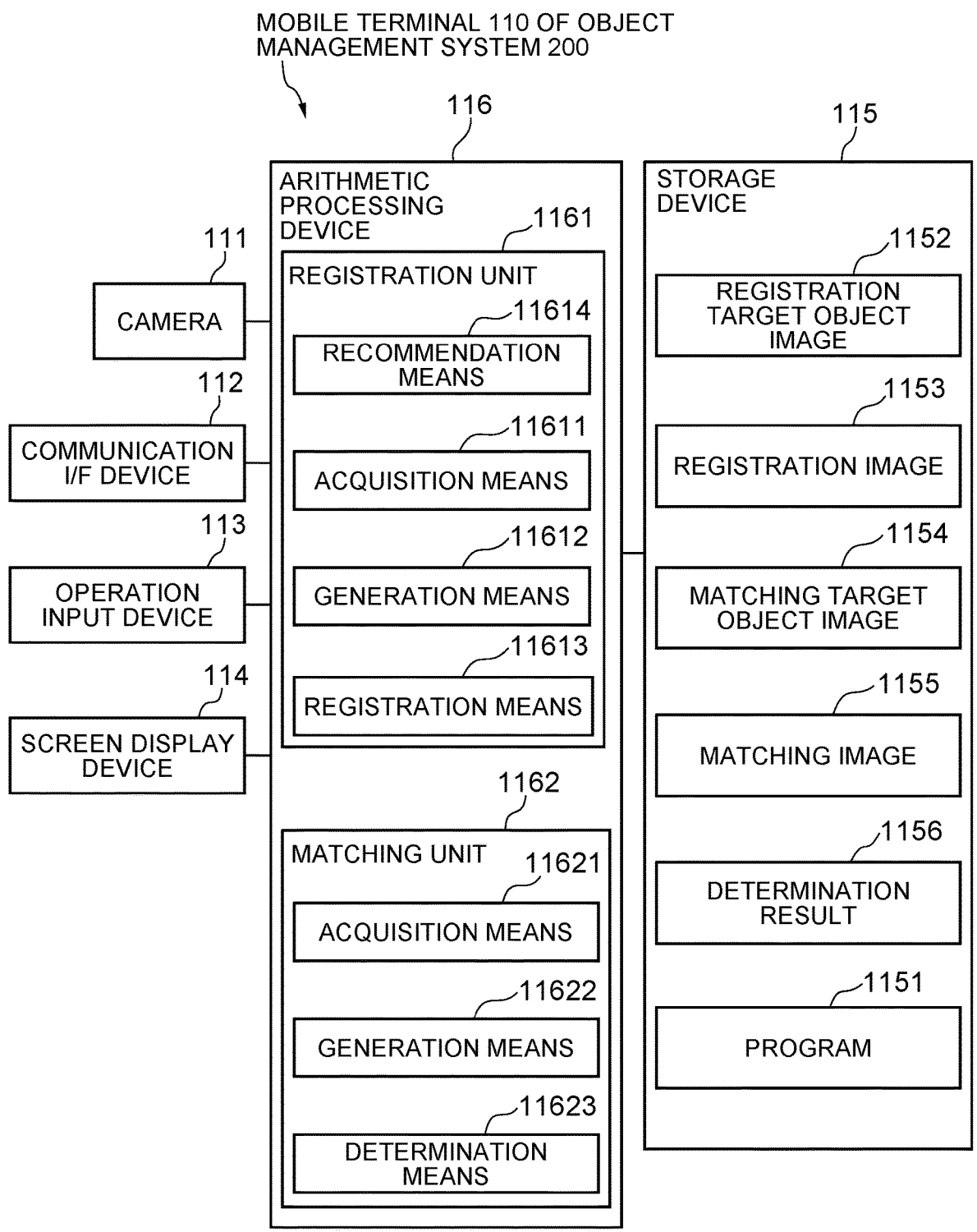
FIG. 15 is a block diagram of a mobile terminal according to a second exemplary embodiment of the present invention.

FIG. 15 is a block diagram of the mobile terminal 110 according to the present embodiment, in which the parts that are the same as those in FIG. 5 are denoted by the same reference numerals, and a reference numeral 11614 denotes a recommendation means. The recommendation means 11614 is configured to present, to the operator of the mobile terminal 110, a recommendation for the type and the description position of a character to be described on the label 151 attached to the registration target object 150, before the acquisition means 11611 acquires an image of the registration target object. The recommendation means 11614 is configured to acquire a recommendation to be presented to the operator, from the server 130.

Figure 16:
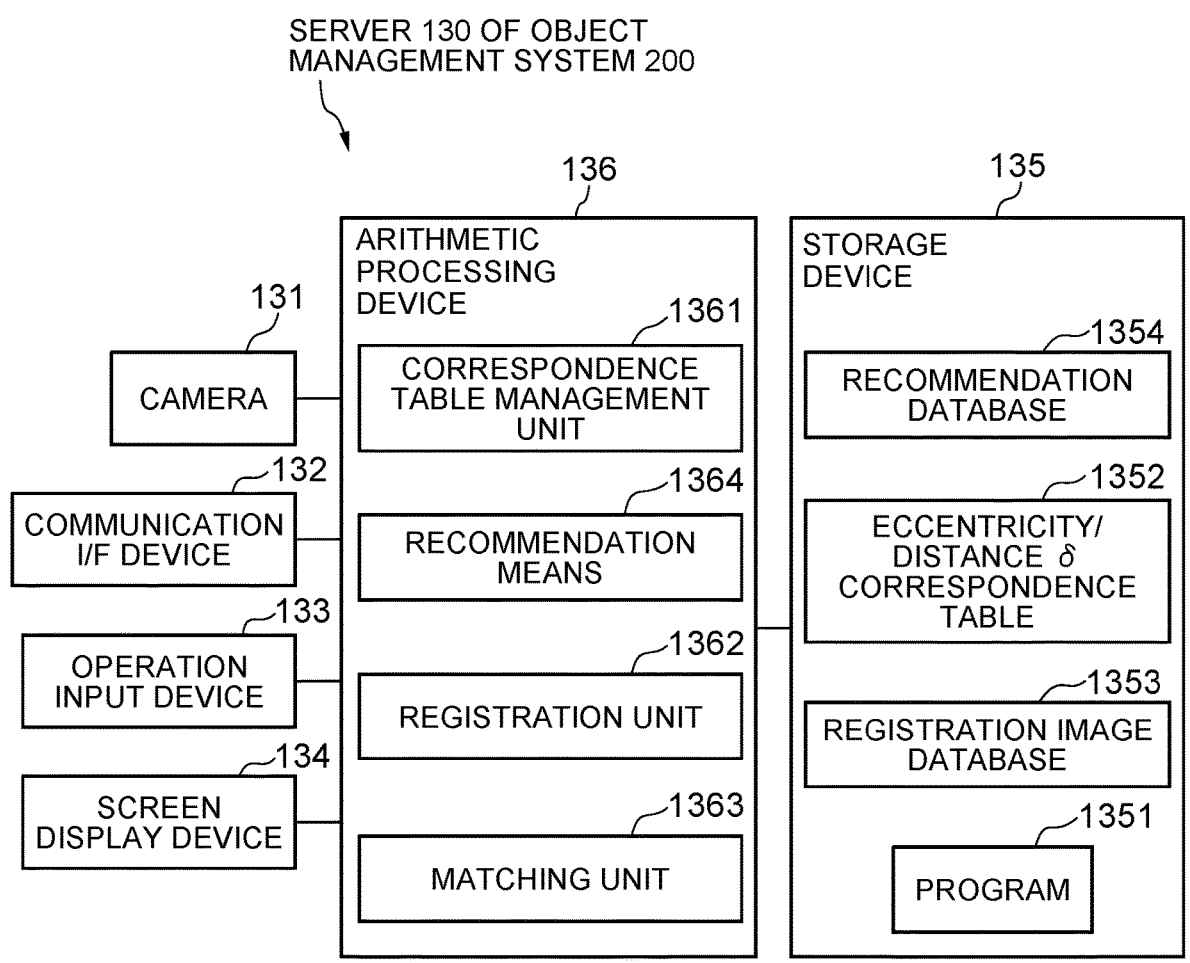
FIG. 16 is a block diagram of a server according to the second exemplary embodiment of the present invention.

FIG. 16 is a block diagram of the server 130 according to the present embodiment, in which the parts that are the same as those in FIG. 6 are denoted by the same reference numerals. A reference numeral 1354 denotes a recommendation database, and a reference numeral 1364 denotes a recommendation means. The recommendation database 1354 is configured to store therein a plurality of combinations of a character type and a description position in advance. The recommendation means 1364 is configured to acquire an unused combination of a character type and a description position from the recommendation database 1354, and provide the recommendation means 11614 of the mobile terminal 110 with it.

FIG. 17 illustrates exemplary contents of the recommendation database 1354. The recommendation database 1354 is configured of a plurality of entries, and one entry includes fields of family name, character description position, character, and used/unused. In the family name field, a family name to be used for a seal is stored. In the character description position field, a recommended character description position is stored. In the character field, a recommended character type is stored. In the used/unused field, the history of whether or not it was used in the past is stored. For example, in the used/unused field, a value 0 is stored if it was not used in the past, and a value 1 is stored if it was used in the past.

Figure 18:
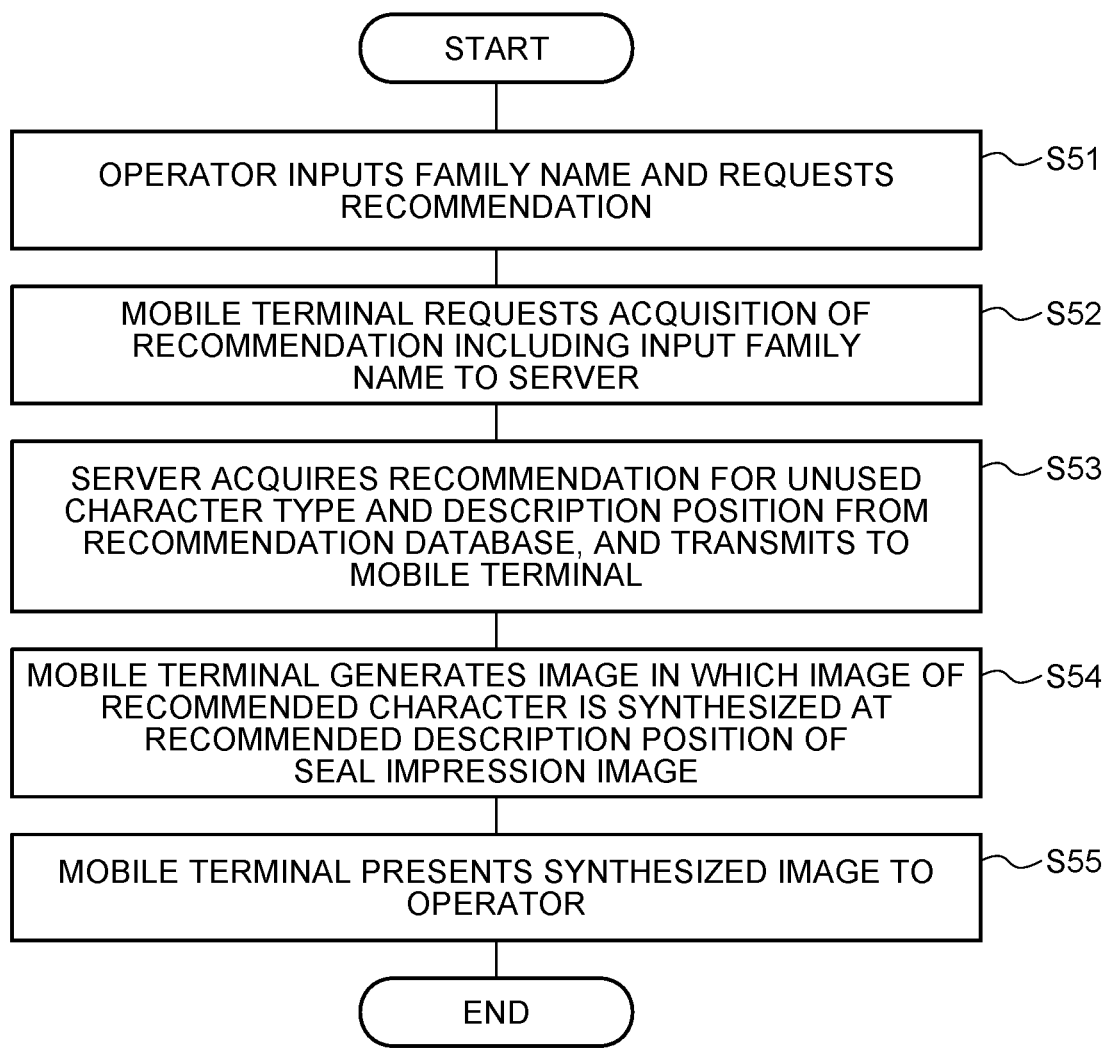
FIG. 18 is a flowchart showing an exemplary procedure of presenting a recommendation to an operator.

Next, an operation of presenting a recommendation to the operator will be described. FIG. 18 is a flowchart showing an exemplary procedure of presenting a recommendation to the operator. First, before describing a seal impression and a handwritten character on the label 151, the operator of the mobile terminal 110 inputs a family name of a seal to be used from the operation input device 113 to request a recommendation for the character type and the description position (step S51). In response, the recommendation means 11614 of the mobile terminal 110 transmits an acquisition request of a recommendation including the input family name to the server 130 via the communication I/F device 112 (step S52). The recommendation means 1364 of the server 130 searches the entries in the recommendation database 1354 for an entry having a family name that is the same as the family name included in the acquisition request and having a value 0 in the used/unused field indicating that such a family name is unused, creates a recommendation including the character described in the character field and the character description position described in the character description position field in the entry, stores a value 1 indicating that the family name is used in the used/unused field on the entry, and transmits the recommendation to the mobile terminal 110 (step S53).

The recommendation means 11614 of the mobile terminal 110 generates an image of the recommendation in which a sample seal impression and a recommended character are drawn at the recommended character description position, in accordance with the character type and the character description position acquired from the server 130 (step S54). Then, the recommendation means 11614 displays the image of the recommendation on the screen display device 114 (step S55).

Figure 19:
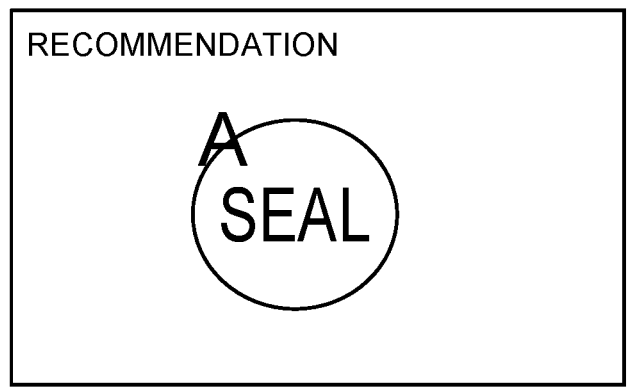
FIG. 19 illustrates an exemplary image of a recommendation to be displayed on a screen display device of a mobile terminal.

FIG. 19 illustrates an exemplary image of a recommendation displayed on the screen display device 114 of the mobile terminal 110. In the recommendation of this example, it is recommended to describe a character "A" on the upper left of the seal impression.

The operator of the mobile terminal 110 visually checks the recommendation displayed on the screen display device 114 to thereby recognize the character type having the individual identification property that should be described in the label 151 and the description position thereof. The registration operation thereafter is the same as the registration operation in the first exemplary embodiment.

As described above, in the present embodiment, since an unused character type and an unused character description position are presented to the user, the individual identification property including a figure and a character can be enhanced. As a result, accuracy of object matching can be further enhanced.

In the above description, the object management system 200 presents a recommendation for a combination of a character type and a description position. However, the object management system 200 may be configured to present a recommendation including only a character type. Alternatively, the object management system 200 may be configured to present a recommendation including only a character description position. Further, in the description, the recommendation database 1354 is configured to store a recommendation for the character type and the character description position, for each family name included in the seal impression. However, the recommendation database 1354 may be configured to store a recommendation for the character type and the character description position in common for every seal impression.

Third Exemplary Embodiment

Next, an object management system according to a third exemplary embodiment of the present invention will be described. The object management system 300 according to the present embodiment differs from the object management system 100 of the first exemplary embodiment in the point of, before writing a registration image into the registration image database 1353, calculating a matching score indicating the similarity between the registration image and a registration image having been stored in the registration image database 1353 and, on the basis of the matching score, determining whether or not to write the registration image into the registration image database 1353, and the point of, in the case of not writing the registration image, prompting a user to perform the registration operation again while adding a character. The other points are the same as those of the object management system 100 of the first exemplary embodiment.

Figure 20:
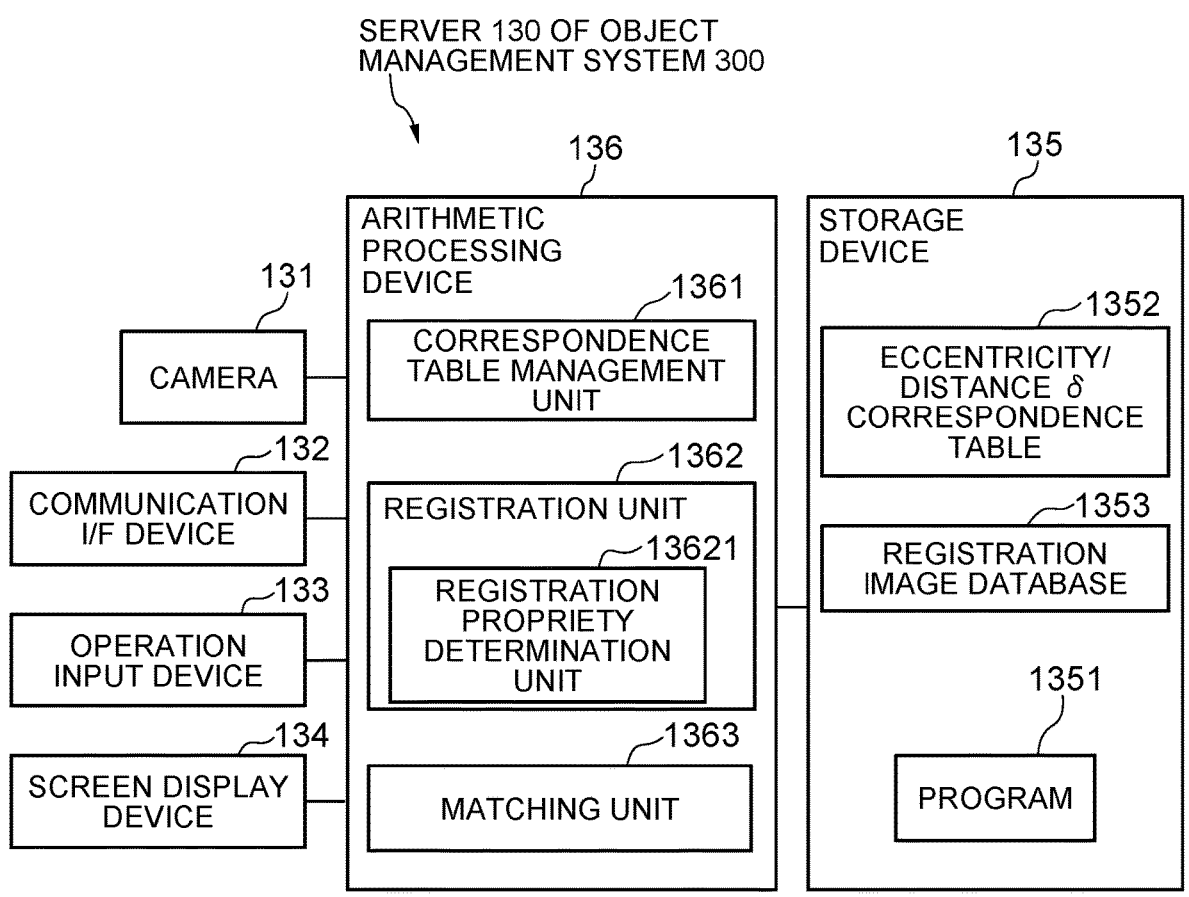
FIG. 20 is a block diagram of a server according to a third exemplary embodiment of the present invention.

FIG. 20 is a block diagram of the server 130 according to the present embodiment, in which the same reference numerals denote the same parts as those in FIG. 6, and a reference numeral 13621 denotes a registration propriety determination unit. The registration propriety determination unit 13621 is configured to, before the registration unit 1362 writes a registration image into the registration image database 1353, calculate matching scores between the registration image and all of the registration images having been stored in the registration image database 1353. The registration propriety determination unit 13621 is also configured to determine whether or not to write the registration image into the registration image database 1353 on the basis of all of the calculated matching scores. For example, the registration propriety determination unit 13621 is configured to determine not to register the registration image when the maximum value of all of the matching scores is equal to or larger than a predetermined threshold, while determine to register it otherwise. In this example, the threshold is set to be the same value as, or a slightly smaller value than, a threshold used for determining the sameness of the object in the matching unit 1363. The registration propriety determination unit 13621 is also configured to, when determining to register, instruct the registration unit 1362 to write the registration image into the registration image database 1353. On the other hand, when determining not to register, the registration propriety determination unit 13621 is configured to stop operation of registering the registration image into the registration image database 1353 and transmit a re-registration operation request message to the mobile terminal 110. The registration means 11613 of the mobile terminal 110 is configured to, when receiving a re-registration operation request message, display a guide screen to prompt the user to perform the registration operation again while adding description, on the screen display device 114.

Figure 21:
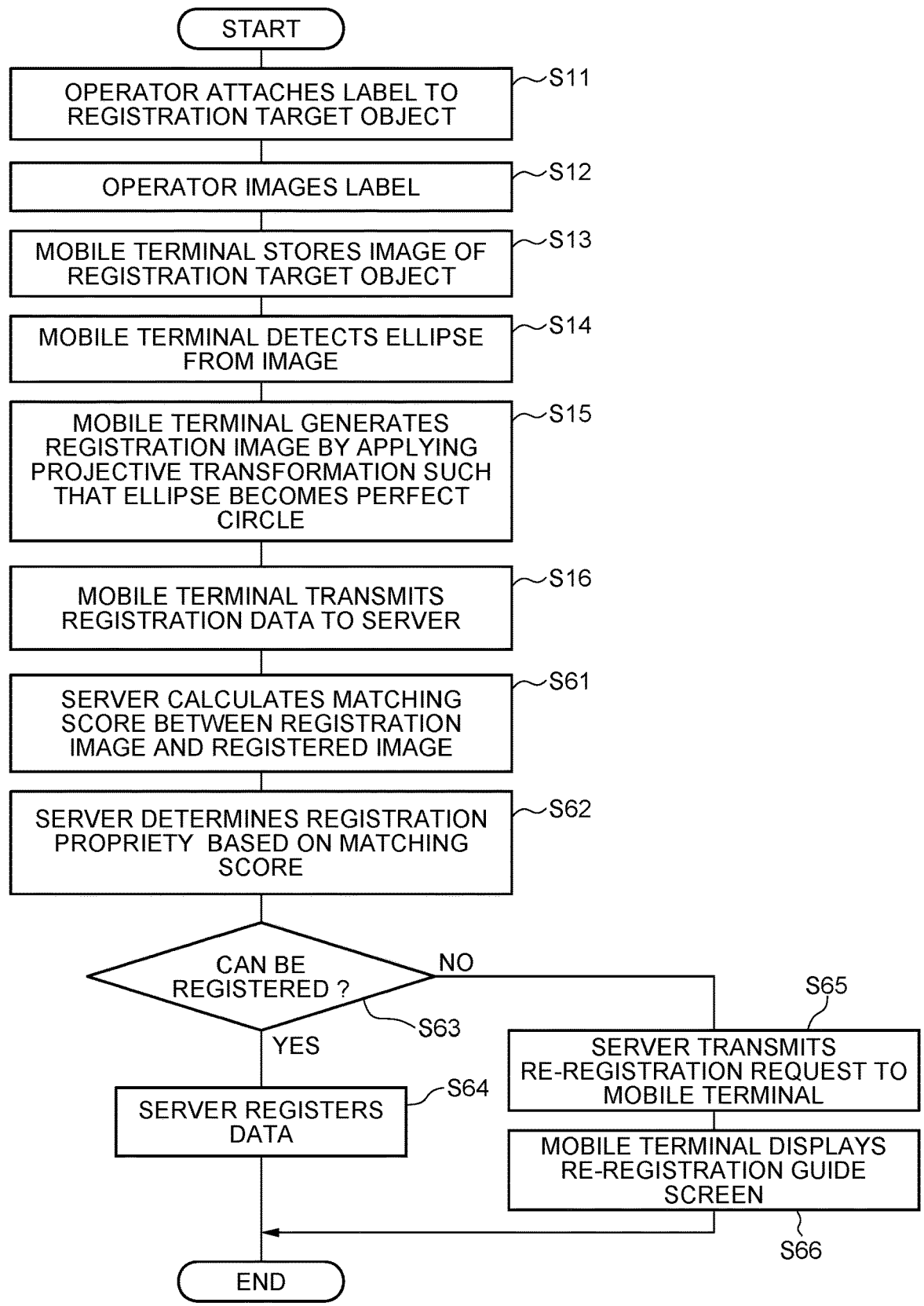
FIG. 21 is a flowchart illustrating an exemplary procedure of registration operation in the third exemplary embodiment of the present invention.

Next, the registration operation of the present embodiment will be described. FIG. 21 is a flowchart showing an exemplary procedure of the registration operation. Referring to FIG. 21, the procedure from step S11 of attaching the label 151, with a seal impression and a handwritten character described thereon, to the registration target object 150 up to transmission of a registration request including the registration image 1153 and the additional information from the mobile terminal 110 to the server 130 is the same as the procedure for registration in the first exemplary embodiment illustrated in FIG. 11.

When the server 130 receives a registration request from the mobile terminal 110 via the communication I/F device 132, the server 130 calculates, by the registration propriety determination unit 13621, matching scores between the registration image and all of the registered images in the registration image database 1353 (step S61). Calculation of a matching score can be performed by, for example, calculating the Fourier-Mellin frequency feature amounts of the images to be matched first, then calculating a cross-power spectrum between the feature amounts, then applying inverse frequency transform thereto to calculate a correlation value map, and then calculating a matching score representing the similarity between the registration image and the registered image from the correlation map. Then, the server 130 determines, by the registration propriety determination unit 13621, whether or not to write the registration image into the registration image database 1353 on the basis of all of the calculated matching scores (step S62). Then, when determining to register (YES at step S63), the server 130 registers registration data including the registration image into the registration image database 1353 by the registration unit 1362 (step S64). Meanwhile, when determining not to register, the server 130 transmits a re-registration operation request to the mobile terminal 110 (step S65). Upon receipt of the re-registration operation request message, the mobile terminal 110 displays a re-registration guide screen to prompt the user to perform the registration operation again while adding description near the seal impression, on the screen display device 114 (step S66).

FIG. 22 illustrates an example of a re-registration guide image to be displayed on the screen display device 114 of the mobile terminal 110. In this example, a message saying "Individual identification property is insufficient. Please perform registration operation again while adding a handwritten character" is shown. When such a re-registration guide screen is displayed, the operator of the mobile terminal 110 can recognize that re-registration operation must be performed and a character must be added for re-registration.

As described above, in the present embodiment, it is possible to prevent a registration image with insufficient individual identification property from being overlooked and registered. Therefore, it is possible to enhance the accuracy of object matching using an image including a figure and a character.

In the above description, a message prompting addition of a handwritten character is displayed on the re-registration guide screen. However, on the re-registration guide screen, a message prompting an increase of the number of seal impressions may be shown. Alternatively, on the re-registration guide screen, a message prompting an increase of the number of handwritten characters and seal impressions may be shown.

Fourth Exemplary Embodiment

Next, an object management system according to a fourth exemplary embodiment of the present invention will be described. An object management system 400 according to the present embodiment differs from the object management system 100 of the first exemplary embodiment in the point of calculating the perfect circle degree of the contour of a seal impression extracted from each of an image of a registration target object and an image of a matching target object, and when the perfect circle degree is equal to or larger than a predetermined threshold, it is deemed that distortion caused by projection is hardly generated in the image of the registration target object and in the image of the matching target object. The other points are the same as those of the object management system 100 of the first exemplary embodiment.

Figure 23:
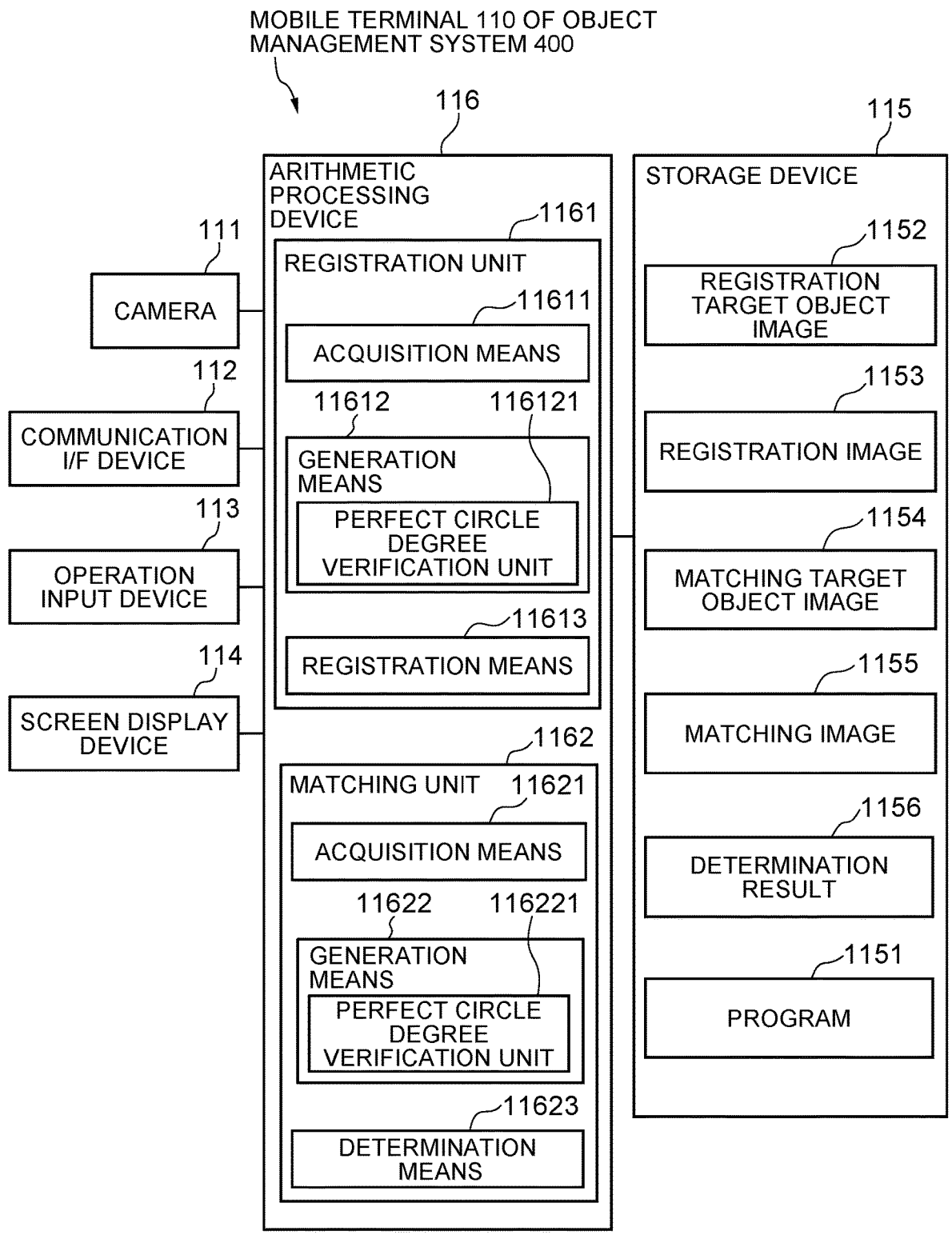
FIG. 23 is a block diagram of a mobile terminal according to a fourth exemplary embodiment of the present invention.

FIG. 23 is a block diagram of the mobile terminal 110 according to the present embodiment, in which the same reference numerals denote the same parts as those in FIG. 5, and each of reference numerals 116121 and 116221 denotes a perfect circle degree verification unit. The perfect circle degree verification unit 116121 is configured to calculate the perfect circle degree of an ellipse corresponding to the contour of a seal impression extracted from an image of the registration target object. Here, the perfect circle degree is an index representing the degree of magnitude of deviation from the perfect circle. For example, the perfect circle degree of an ellipse can be represented by a value obtained by subtracting the eccentricity of the ellipse from 1. In that case, as the ellipse is closer to a circle, the perfect circle degree of the ellipse becomes a value closer to 1. The perfect circle degree verification unit 116121 is also configured to determine whether or not to handle the image of the registration target object as a registration image, on the basis of a result of comparing the perfect circle degree of the ellipse with a preset threshold. Assuming that the threshold is 0.9 for example, the perfect circle degree verification unit 116121 handles the image of the registration target object as a registration image when the perfect circle degree of the ellipse is 0.9 or larger.

The perfect circle degree verification unit 116221 is configured to calculate the perfect circle degree of an ellipse corresponding to the contour of a seal impression extracted from an image of the matching target object. The perfect circle degree verification unit 116221 is also configured to determine whether or not to handle the image of the matching target object as a matching image, on the basis of a result of comparing the perfect circle degree of the ellipse with a preset threshold.

Figure 24:
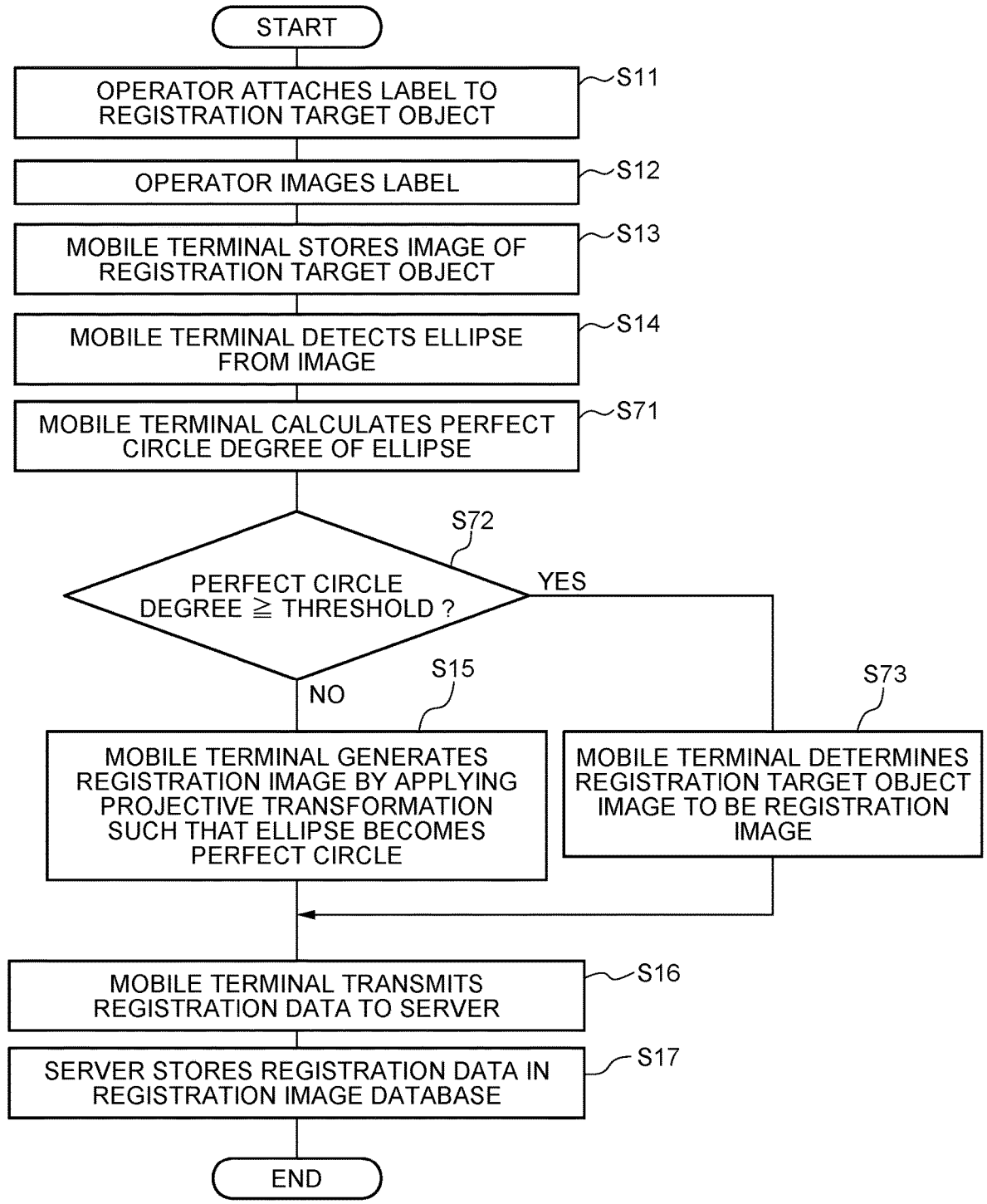
FIG. 24 is a flowchart illustrating an exemplary procedure of registration operation in the fourth exemplary embodiment of the present invention.

Next, the registration operation of the present embodiment will be described. FIG. 24 is a flowchart showing an exemplary procedure of the registration operation. Referring to FIG. 24, the procedure from step S11 of attaching the label 151 with a seal impression and a handwritten character described thereon to the registration target object 150 up to step S14 of extracting an ellipse corresponding to the contour of the seal impression from an image of the registration target object is the same as the procedure for registration in the first exemplary embodiment illustrated in FIG. 11.

Then, the mobile terminal 110 calculates the perfect circle degree of the extracted ellipse by the perfect circle degree verification unit 116121 (step S71). Then, the mobile terminal 110 compares the calculated perfect circle degree with the threshold by the perfect circle degree verification unit 116121 (step S72). Then, when the perfect circle degree is equal to or larger than the threshold, the mobile terminal 110 handles the image of the registration target object as a registration image (step S73), and proceeds to step S16. Meanwhile, when the perfect circle degree is smaller than the threshold, the mobile terminal 110 proceeds to step S15. Step S15 to S17 are the same as step S15 to S17 for registration in the first exemplary embodiment illustrated in FIG. 11.

Figure 25:
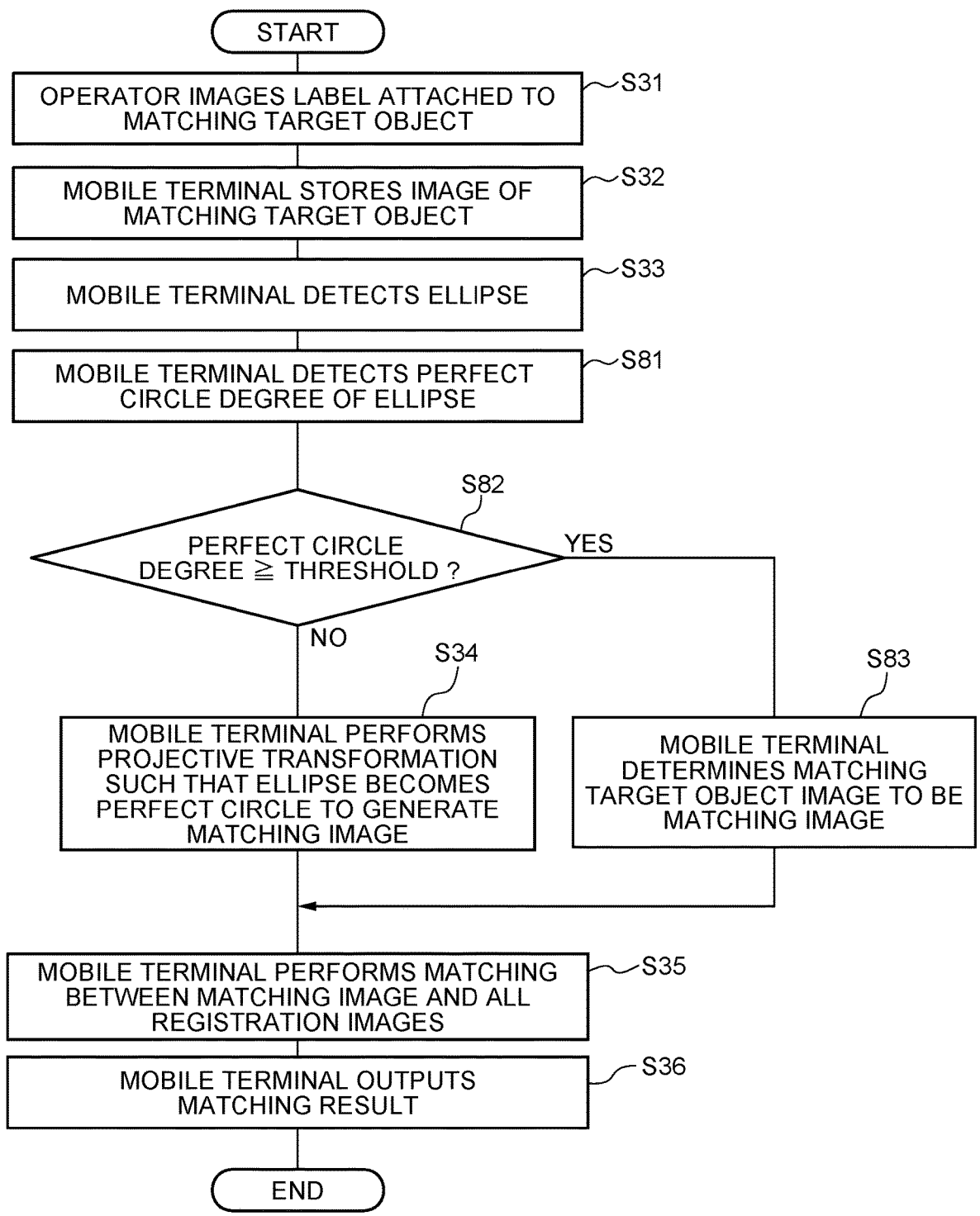
FIG. 25 is a flowchart illustrating an exemplary procedure of matching operation in the fourth exemplary embodiment of the present invention.

Next, the matching operation of the present embodiment will be described. FIG. 25 is a flowchart showing an exemplary procedure of the matching operation. Referring to FIG. 25, the procedure from step S31 of acquiring an image of the label 151 attached to the matching target object up to step S33 of extracting an ellipse corresponding to the contour of a seal impression from the image of the matching target object is the same as the procedure for matching in the first exemplary embodiment illustrated in FIG. 13.

Then, the mobile terminal 110 calculates the perfect circle degree of the extracted ellipse by the perfect circle degree verification unit 116221 (step S81). Then, the mobile terminal 110 compares the calculated perfect circle degree with the threshold by the perfect circle degree verification unit 116221 (step S82). Then, when the perfect circle degree is equal to or larger than the threshold, the mobile terminal 110 handles the image of the matching target object as a matching image (step S83), and proceeds to step S35. Meanwhile, when the perfect circle degree is smaller than the threshold, the mobile terminal 110 proceeds to step S34. Steps S34 to S36 are the same as steps S34 to S36 for matching in the first exemplary embodiment illustrated in FIG. 13.

As described above, in the present embodiment, the perfect circle degrees of the contours of seal impressions extracted from an image of a registration target object and an image of a matching target object is calculated, and on the basis of the perfect circle degrees, it is determined whether or not to handle the image of the registration target object and the image of the matching target object as a registration image and a matching image. Therefore, processing of correcting distortion caused by projection is performed only when an influence of the distortion caused by projection cannot be disregarded. Otherwise, processing of correcting distortion caused by projection can be omitted. Thereby, it is possible to realize higher-speed processing while maintaining the accuracy of object matching by using an image including a figure and a character.

In the above description, when the perfect circle degree of the contour of a seal impression extracted from an image of a registration target object is less than a threshold, a registration image in which distortion caused by projection has been corrected is generated and registered. However, the present embodiment may be configured to, when the perfect circle degree of the contour of a seal impression extracted from an image of a registration target object is less than a threshold, discard the image of the registration target object and display a screen guiding the user to capture an image of the label again from the right front, on the screen display device 114.

Further, in the above description, when the perfect circle degree of the contour of a seal impression extracted from an image of a matching target object is less than a threshold, a matching image in which distortion caused by projection has been corrected is generated and registered. However, the present embodiment may be configured to, when the perfect circle degree of the contour of a seal impression extracted from an image of a matching target object is less than a threshold, discard the image of the matching target object and display a screen guiding the user to capture an image of the label again from the right front, on the screen display device 114.

Fifth Exemplary Embodiment

Next, an object management system according to a fifth exemplary embodiment of the present invention will be described. In the present embodiment, the outline of an object management system according to the present invention will be described.

Figure 26:
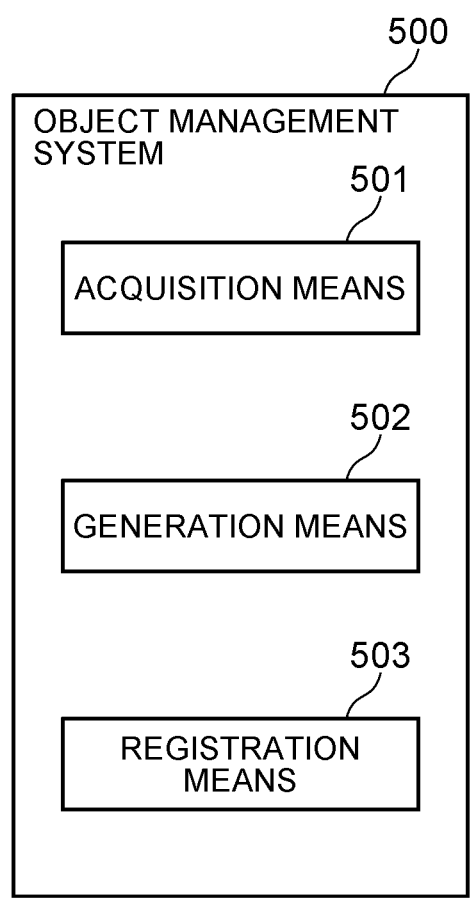
FIG. 26 is a block diagram of an object management system according to a fifth exemplary embodiment of the present invention.

Referring to FIG. 26, an object management system 500 according to the present embodiment is configured of an acquisition means 501, a generation means 502, and a registration means 503.

The acquisition means 501 is configured to acquire an image capturing a surface of a registration target object on which a circle and a handwritten character are drawn. The acquisition means 501 may have the same configuration as that of the acquisition means 11611 of FIG. 5 for example, but is not limited thereto.

The generation means 502 is configured to detect an ellipse corresponding to the circle from the image acquired by the acquisition means 501, and generate a registration image in which the image is applied with projective transformation such that the ellipse becomes a circle. The generation means 502 may have the same configuration as that of the generation means 11612 of FIG. 5 for example, but is not limited thereto.

The registration means 503 is configured to write the registration image generated by the generation means 502 into a storage means as data for determining the sameness of the registration target object. The registration means 503 may have the same configuration as that of the registration means 11613 of FIG. 5 for example, but is not limited thereto.

The object management system 500 configured as described above operates as described below. First, the acquisition means 501 acquires an image in which a surface of a registration target object, having a circle and a handwritten character drawn thereon, is captured. Then, the generation means 502 detects an ellipse corresponding to the circle from the image acquired by the acquisition means 501, and generates a registration image in which the image is applied with projective transformation such that the ellipse becomes a circle. Then, the registration means 503 is configured to write the registration image generated by the generation means 502 into a storage means as data for determining the sameness of the registration target object.

The object management system 500 according to the present embodiment is configured and operates as described above to thereby be able to enhance the accuracy of object matching by using an image including a figure and a character. This is because the generation means 502 detects an ellipse corresponding to the circle from the image acquired by the acquisition means 501, and generates a registration image in which the image is applied with projective transformation such that the ellipse becomes a circle.

Sixth Exemplary Embodiment

Next, an object matching system according to a sixth exemplary embodiment of the present invention will be described. In the present embodiment, the outline of an object matching system according to the present invention will be described.

Figure 27:
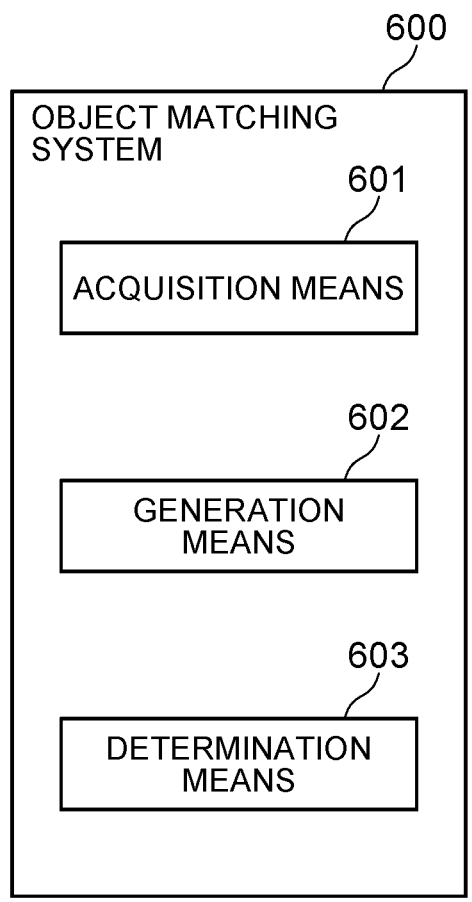
FIG. 27 is a block diagram of an object management system according to a sixth exemplary embodiment of the present invention.

Referring to FIG. 27, an object matching system 600 according to the present embodiment is configured of an acquisition means 601, a generation means 602, and a determination means 603.

The acquisition means 601 is configured to acquire an image in which a surface of a registration target object, having a circle and a handwritten character drawn thereon, is captured. The acquisition means 601 may have the same configuration as that of the acquisition means 11621 of FIG. 5 for example, but is not limited thereto.

The generation means 602 is configured to detect an ellipse corresponding to the circle from the image acquired by the acquisition means 601, and generate a matching image in which the image is applied with projective transformation such that the ellipse becomes a circle. The generation means 602 may have the same configuration as that of the generation means 11622 of FIG. 5 for example, but is not limited thereto.

The determination means 603 is configured to compare the matching image generated by the generation means 602 with a registration image of the registration target object stored in the storage means to thereby determine the sameness of the matching target object and the registration target object. The determination means 603 may have the same configuration as that of the determination means 11623 of FIG. 5 for example, but is not limited thereto.

The object matching system 600 configured as described above operates as described below. First, the acquisition means 601 acquires an image in which a surface of a matching target object, having a circle and a handwritten character drawn thereon, is captured. Then, the generation means 602 detects an ellipse corresponding to the circle from the image acquired by the acquisition means 601, and generates a matching image in which the image is applied with projective transformation such that the ellipse becomes a circle. Then, the determination means 603 compares the matching image generated by the generation means 602 with a registration image of the registration target object stored in the storage means to thereby determine the sameness of the matching target object and the registration target object.

The object matching system 600 according to the present embodiment is configured and operates as described above to thereby be able to enhance the accuracy of object matching by using an image including a figure and a character. This is because the generation means 602 detects an ellipse corresponding to the circle from the image acquired by the acquisition means 601, and generates a matching image in which the image is applied with projective transformation such that the ellipse becomes a circle.

Other Exemplary Embodiments

While the present invention has been described with reference to some exemplary embodiments, the present invention is not limited to those exemplary embodiment described above, and various additions and changes can be made. For example, additions and changes as described below can be made.

For example, as a method of applying projective transformation to an image such that the ellipse in the image becomes a circle, the method described in Non-Patent Literature 1 may be used. For example, it is possible to calculate contact points where a straight line, running through an intersection point of a vanishing line on the image and an extended line of the short axis of the ellipse, contacts the ellipse as vertexes R and S of a square in internal contact with the original circle, calculate both end points of the short axis of the ellipse as vertexes P and Q of the square, and calculate projective transformation coefficients from the coordinates of the vertexes of the square before and after the transformation. Further, in order to obtain a vanishing line, a plurality of figures such as parallelograms may be drawn besides the circle on the surface of the registration target object.

Further, as a method of obtaining projective transformation coefficients for applying projective transformation to an image such that the ellipse in the image becomes a circle, various methods other than those described above may be used. For example, projective transformation coefficients may be calculated from the parameters of the ellipse in the image and the focal distance of the camera. Alternatively, as a method of applying projective transformation to an image such that the ellipse in the image becomes a circle, it is possible to estimate the position and posture of the camera with respect to the center of the perfect circle by using a Kalman filter, with use of a plurality of images (time-series images) and the speed and acceleration of the camera, to thereby obtain projective transformation coefficients. Alternatively, it is possible to draw two or more perfect circles on the surface of a registration target object, and obtain a vanishing point from two or more ellipses corresponding to the two or more perfect circles in the image, to thereby obtain projective transformation coefficients.

Further, in the exemplary embodiments described above, a registration image stored in the registration image database 1353 may be a Fourier-Mellin frequency spectrum image that is obtained by applying, to the registration image 1153, frequency transform, polar transform or log-polar coordinate transform, and frequency transform, in this sequence Further, in the exemplary embodiments described above, a circle drawn on the surface of a registration target object may be a circle other than the contour of a seal impression. For example, it may be a sticker in which a circle is drawn in a color different from the background color. Alternatively, it may be a circle handwritten by a user with a pen using a circle template ruler.

Further, in the exemplary embodiments described above, part of the processing executed by the mobile terminal 101 may be executed by the server 130. For example, the whole or part of the processing of steps S14 and S15 of FIG. 11, steps S33 to S35 of FIG. 13, steps S41 to S46 of FIG. 14, step S54 of FIG. 18, and steps S71 to S73 of FIG. 24 may be executed by the server 130.

Further, in the exemplary embodiments described above, the whole or part of the processing executed by the server 130 may be executed by the mobile terminal 110. For example, the whole or part of the processing of steps S1 to S7 of FIG. 9, step S17 of FIG. 11, step S53 of FIG. 18, and steps S61 to S65 of FIG. 21 may be executed by the mobile terminal 110.

INDUSTRIAL APPLICABILITY

The present invention can be used in the fields of traceability related to C2C transaction, personal authentication related to entrance/exit management, and the like.

The whole or part of the exemplary embodiments disclosed above can be described as, but not limited to, the following supplementary notes.

(Supplementary Note 1)

An object management system comprising:

first acquisition means for acquiring a first image in which a surface of a registration target object is captured, the surface having a first circle and a first handwritten character drawn on the surface;

first generation means for detecting a first ellipse corresponding to the first circle from the first image, and generating a registration image in which the first image is applied with projective transformation such that the first ellipse becomes a circle; and registration means for writing the registration image into storage means as data for determining sameness of the registration target object.

(Supplementary Note 2)

The object management system according to supplementary note 1, further comprising storage means for calculating, for each of a plurality of reference images in which a reference circle is captured from various capturing directions, a feature amount of a reference ellipse corresponding to the reference circle in the reference image, and a distance between a center point of the reference ellipse and a point in the reference image corresponding to a center of the reference circle, and storing the feature amount of the reference ellipse and the distance in association with each other in advance, wherein the first generation means is configured to acquire, from the storage means, the distance corresponding to the feature amount of the reference ellipse that matches a feature amount of the first ellipse, and calculate a projective transformation coefficient for projective transformation by using coordinate values of a square before and after the projective transformation, the square having vertexes that are four points in total including two intersection points between a straight line and the first ellipse, the straight line running through a point away from a center of the first ellipse by the distance in a depth direction of a short axis of the first ellipse in parallel with a long axis of the first ellipse, and both end points of the short axis of the first ellipse.

(Supplementary Note 3)

The object management system according to supplementary note 1 or 2, wherein the first circle is a circle that forms a contour of a seal impression put on the surface.

(Supplementary Note 4)

The object management system according to any of supplementary notes 1 to 3, further comprising recommendation means for selecting an unused recommendation from among a plurality of recommendations each defining a combination of a character type and a character description position, and presenting the unused recommendation to a user.

(Supplementary Note 5)

The object management system according to any of supplementary notes 1 to 4, further comprising registration propriety determination means for, before writing the registration image, calculating a matching score between the registration image and an image having been stored in the storage means, and on a basis of the matching score, determining whether or not to write the registration image into the storage means.

(Supplementary Note 6)

The object management system according to supplementary note 5, wherein the registration propriety determination means is configured to, when determining not to write the registration image into the storage means, guide a user to perform registration operation again while adding description on the object.

(Supplementary Note 7)

The object management system according to any of supplementary notes 1 to 6, further comprising perfect circle degree verification means for calculating a perfect circle degree of the first ellipse, and determining whether or not to handle the first image as the registration image without change, on a basis of the perfect circle degree.

(Supplementary Note 8)

The object management system according to any of supplementary notes 1 to 7, further comprising:

second acquisition means for acquiring a second image in which a surface of a matching target object is captured, the surface having a second circle and a second handwritten character drawn on the surface;

second generation means for detecting a second ellipse corresponding to the second circle from the second image, and generating a matching image in which the second image is applied with projective transformation such that the second ellipse becomes a circle; and determination means for comparing the matching image with the registration image stored in the storage means, and determining sameness of the matching target object and the registration target object.

(Supplementary Note 9)

The object management system according to supplementary note 8, further comprising perfect circle degree verification means for calculating a perfect circle degree of the second ellipse, and determining whether or not to handle the second image as a matching image without change, on a basis of the perfect circle degree.

(Supplementary Note 10)

An object management method comprising:

acquiring a first image in which a surface of a registration target object is captured, the surface having a first circle and a first handwritten character drawn on the surface;

detecting a first ellipse corresponding to the first circle from the first image, and generating a registration image in which the first image is applied with projective transformation such that the first ellipse becomes a circle; and writing the registration image into storage means as data for determining sameness of the registration target object.

(Supplementary Note 11)

A computer-readable medium storing a program for causing a computer to perform processing of:

acquiring a first image in which a surface of a registration target object is captured, the surface having a first circle and a first handwritten character drawn on the surface;

detecting a first ellipse corresponding to the first circle from the first image, and generating a registration image in which the first image is applied with projective transformation such that the first ellipse becomes a circle; and writing the registration image into storage means as data for determining sameness of the registration target object.

(Supplementary Note 12)

An object matching system comprising:

acquisition means for acquiring a first image in which a surface of a matching target object is captured, the surface having a first circle and a handwritten character drawn on the surface;

generation means for detecting a first ellipse corresponding to the first circle from the first image, and generating a matching image in which the first image is applied with projective transformation such that the first ellipse becomes a circle; and determination means for comparing the matching image with a registration image of a registration target object stored in storage means, and determining sameness of the matching target object and the registration target object.

REFERENCE SIGNS LIST 100 object management system
110 mobile terminal
111 camera
112 communication I/F device
113 operation input device
114 screen display device
115 storage device
1151 program
1152 registration target object image
1153 registration image
1154 matching target object image
1155 matching image
1156 determination result
116 arithmetic processing device
1161 registration unit
11611 acquisition means
11612 generation means
116121 perfect circle degree verification unit
11613 registration means
11614 recommendation means
1162 matching unit
11621 acquisition means
11622 generation means
116221 perfect circle degree verification unit
11623 determination means
120 seal-attached ball-point pen
121 ball-point pen
122 self-inking stamp
122a stamp surface
130 server
131 camera
132 communication I/F device
133 operation input device
134 screen display device
135 storage device
1351 program
1352 eccentricity/distance δ correspondence table
1353 registration image database
1354 recommendation database
136 arithmetic processing device
1361 correspondence table management unit
1362 registration unit
13621 registration propriety determination unit
1363 matching unit
1364 recommendation means
140 network
150 object
151 label
500 object management system
501 acquisition means
502 generation means
503 registration means
600 object matching system
601 acquisition means
602 generation means
603 determination means

What is claimed is:

1. An object management system comprising:
a first memory containing program instructions; and
a processor coupled to the memory, wherein the processor is configured to execute the program instructions to:
acquire a first image in which a surface of a registration target object is captured, the surface having a first circle and a first handwritten character drawn on the surface;
detect a first ellipse corresponding to the first circle from the first image;
generate a registration image in which the first image is applied with projective transformation such that the first ellipse becomes a circle; and
write the registration image into a second memory as data for determining sameness of the registration target object.

2. The object management system according to claim 1, further comprising
a third memory that calculates, for each of a plurality of reference images in which a reference circle is captured from various capturing directions, a feature amount of a reference ellipse corresponding to the reference circle in the reference image, and a distance between a center point of the reference ellipse and a point in the reference image corresponding to a center of the reference circle, and stores the feature amount of the reference ellipse and the distance in association with each other in advance, wherein
the processor is further configured to execute the instructions to
acquire, from the third memory, the distance corresponding to the feature amount of the reference ellipse that matches a feature amount of the first ellipse, and calculate a projective transformation coefficient for projective transformation by using coordinate values of a square before and after the projective transformation, the square having vertexes that are four points in total including two intersection points between a straight line and the first ellipse, the straight line running through a point away from a center of the first ellipse by the distance in a depth direction of a short axis of the first ellipse in parallel with a long axis of the first ellipse, and both end points of the short axis of the first ellipse.

3. The object management system according claim 1, wherein
the first circle is a circle that forms a contour of a seal impression put on the surface.

4. The object management system according to claim 1, wherein the processor is further configured to execute the instructions to
select an unused recommendation from among a plurality of recommendations each defining a combination of a character type and a character description position, and present the unused recommendation to a user.

5. The object management system according to claim 1, wherein the processor is further configured to execute the instructions to,
before writing the registration image, calculate a matching score between the registration image and an image having been stored in the second memory, and on a basis of the matching score, determine whether or not to write the registration image into the second memory.

6. The object management system according to claim 1, wherein the processor is further configured to execute the instructions to
calculate a perfect circle degree of the first ellipse, and determine whether or not to handle the first image as the registration image without change, on a basis of the perfect circle degree.

7. The object management system according to claim 1, wherein the processor is further configured to execute the instructions to:
acquire a second image in which a surface of a matching target object is captured, the surface having a second circle and a second handwritten character drawn on the surface;
detect a second ellipse corresponding to the second circle from the second image;
generate a matching image in which the second image is applied with projective transformation such that the second ellipse becomes a circle; and
compare the matching image with the registration image stored in the second memory, and determine sameness of the matching target object and the registration target object.

8. The object management system according to claim 5, wherein the processor is further configured to execute the instructions to,
when determining not to write the registration image into the second memory, guide a user to perform registration operation again while adding description on the object.

9. The object management system according to claim 7, wherein the processor is further configured to execute the instructions to
calculate a perfect circle degree of the second ellipse, and determine whether or not to handle the second image as a matching image without change, on a basis of the perfect circle degree.

10. An object management method comprising:
acquiring a first image in which a surface of a registration target object is captured, the surface having a first circle and a first handwritten character drawn on the surface;
detecting a first ellipse corresponding to the first circle from the first image, and generating a registration image in which the first image is applied with projective transformation such that the first ellipse becomes a circle; and
writing the registration image into a memory as data for determining sameness of the registration target object.

11. A non-transitory computer-readable medium storing a program comprising instructions for causing a computer to perform processing of:
acquiring a first image in which a surface of a registration target object is captured, the surface having a first circle and a first handwritten character drawn on the surface;
detecting a first ellipse corresponding to the first circle from the first image, and generating a registration image in which the first image is applied with projective transformation such that the first ellipse becomes a circle; and
writing the registration image into a memory as data for determining sameness of the registration target object.

* * * * *